(12) United States Patent
Kiyose

(10) Patent No.: US 8,659,582 B2
(45) Date of Patent: Feb. 25, 2014

(54) INPUT SYSTEM AND PEN-SHAPED INPUT DEVICE

(75) Inventor: Kanechika Kiyose, Matsumoto (JP)

(73) Assignee: Seiko Epson Corporation (JP)

( * ) Notice: Subject to any disclaimer, the term of this patent is extended or adjusted under 35 U.S.C. 154(b) by 129 days.

(21) Appl. No.: 13/437,417

(22) Filed: Apr. 2, 2012

(65) Prior Publication Data

US 2012/0249482 A1    Oct. 4, 2012

(30) Foreign Application Priority Data

Apr. 4, 2011   (JP) .................. 2011-082502

(51) Int. Cl.
*G09G 3/22*   (2006.01)

(52) U.S. Cl.
USPC .......................................... 345/183; 345/175

(58) Field of Classification Search
USPC .................. 345/156–158, 173–175, 179–184
See application file for complete search history.

(56) References Cited

FOREIGN PATENT DOCUMENTS

| JP | 01-224888 | 9/1989 |
|----|-----------|--------|
| JP | 10-011574 | 1/1998 |
| JP | 2003-016251 | 1/2003 |
| JP | 2004-205962 | 7/2004 |
| JP | 2009-008537 | 1/2009 |

*Primary Examiner* — Ricardo L Osorio
(74) *Attorney, Agent, or Firm* — Harness, Dickey & Pierce, P.L.C.

(57) ABSTRACT

An input system includes an input device including at least one of a first reflecting section having a reflectance varying in a longitudinal direction, and a second reflecting section having a reflectance varying in a rotational direction, a detection section adapted to detect reflected light from at least one of the first reflecting section and the second reflecting section, and a processing section adapted to obtain at least one of movement amount information of the first reflecting section in the longitudinal direction, and rotation amount information in the rotational direction of the second reflecting section, based on the detection result in the detection section.

12 Claims, 17 Drawing Sheets

INPUT SYSTEM AND PEN-SHAPED INPUT DEVICE

BACKGROUND

1. Technical Field

The present invention relates to an input system, and a pen-shaped input device.

2. Related Art

Systems for inputting, for example, characters and figures on a computer with an input device (e.g., a pen-shaped input device) used by a user are known. In, for example, an electronic blackboard system, it is possible to perform a process such as drawing a line in an area corresponding to a trajectory of movement by moving an input device on a target surface (a whiteboard). Further, as described in JP-A-2004-205962, a calligraphy learning system of performing character input using an input system utilizing the kinesthetic sense is proposed.

However, in the electronic blackboard system and the like, the input of characters and figures is performed by detecting the two-dimensional position coordinate information of a part (e.g., a pen tip of a pen-shaped input device) of an input device, and in most cases, the three-dimensional movement of the input device is not considered. Further, in the calligraphy learning system of JP-A-2004-205962, although the three-dimensional position coordinate information corresponding to, for example, the pressing of a brush can be obtained, there is a problem that the system becomes large-scale, and further, an odd feeling is caused in the user as compared to when actually moving the brush. Further, the system utilizing the kinesthetic sense can fail to recognize the expression of rotating the brush at a certain position frequently used in calligraphy.

SUMMARY

An advantage of some aspects of the invention is to provide an input system and a pen-shaped input device capable of performing detection and processing of reflected light to thereby obtain position information of the input device, and utilize the position information for input in the system.

An aspect of the invention is directed to an input system including an input device including at least one of a first reflecting section having a reflectance varying in a longitudinal direction, and a second reflecting section having a reflectance varying in a rotational direction around an axis extending in the longitudinal direction, a detection section adapted to detect reflected light from at least one of the first reflecting section and the second reflecting section, and a processing section adapted to obtain at least one of movement amount information of the first reflecting section in the longitudinal direction, and rotation amount information in the rotational direction of the second reflecting section, based on the detection result in the detection section.

According to the aspect of the invention, the input device includes at least one of the first reflecting section and the second reflecting section, and the input system obtains at least one of the movement amount information of the first reflecting section in the longitudinal direction and the rotation amount information of the second reflecting section in the rotational direction. Therefore, it becomes possible to obtain, for example, three-dimensional movement of the input device as an input value of the system.

The aspect of the invention may be configured such that the first reflecting section has the reflectance gradually varying in the longitudinal direction of the input device, and the second reflecting section has the reflectance gradually varying in the rotational direction around the axis along the longitudinal direction.

Thus, it becomes possible to use the input device having the reflectance gradually varying in the longitudinal direction or the rotational direction in the input system.

The aspect of the invention may be configured such that the processing section obtains position information of a pointing position of the input device based on the detection result of the reflectance in the first reflecting section.

Thus, since the position information of the pointing position of the input device can be obtained based on the detection result of the reflected light in the first reflecting section, it becomes possible to perform a process such as the drawing of a line at the pointing position.

The aspect of the invention may be configured such that the detection section includes a first detection section adapted to detect the reflected light from the first reflecting section, and a second detection section adapted to detect the reflected light from the second reflecting section.

Thus, it also becomes possible to take a configuration of separately including the first detection section for the first reflecting section and the second detection section for the second reflecting section. Further, the movement amount information and the rotation amount information can be obtained with two detection sections.

The aspect of the invention may be configured such that the first detection section includes a first part detection section adapted to detect reflected light from a first part of the first reflecting section, and a second part detection section adapted to detect reflected light from a second part longitudinally spaced apart from the first part, and the processing section obtains tilt information of the input device based on the detection result in the first part detection section and the second part detection section.

Thus, it becomes possible to detect the reflected light from the two different parts on the first reflecting section respectively by the first part detection section and the second part detection section. Further, the movement amount information and the rotation amount information can be obtained with three detection sections.

The aspect of the invention may be configured such that the input device is a pen-shaped input device, and the processing section obtains writing pressure information of the pen-shaped input device based on the movement amount information of the first reflecting section in the longitudinal direction.

Thus, in the case in which the input device is a pen-shaped input device, it becomes possible to obtain the information corresponding to the writing pressure of the pen.

The aspect of the invention may be configured such that the detection section includes an irradiation section adapted to emit outgoing light, and a light receiving section adapted to receive reflected light caused by the input device reflecting the outgoing light, and the processing section obtains at least one of the movement amount information of the first reflecting section in the longitudinal direction and the rotation amount information of the second reflecting section based on a light reception result in the light receiving section.

Thus, it becomes possible to use the configuration including the irradiation section and the light receiving section such as the optical position detection device including the irradiation section and the light receiving section in the input system.

The aspect of the invention may be configured such that the light receiving section is disposed at a center of the irradiation section, and the light receiving section receives the reflected light reflected toward the irradiation section out of the reflected light caused by the input device reflecting the outgoing light emitted by the irradiation section.

Thus, it becomes possible to make the positions in which the irradiation section and the light receiving section are disposed correspond to each other. In particular, in the case in which a retroreflective member is used in the input device, it becomes possible for the light receiving section to receive intensive reflected light.

The aspect of the invention may be configured such that the irradiation section includes a first irradiation unit disposed at a first X-coordinate position, and a second irradiation unit disposed at a second X-coordinate position that is different from the first X-coordinate position, the light receiving section includes a first light receiving unit for the first irradiation unit, and a second light receiving unit for the second irradiation unit, the first light receiving unit for the first irradiation unit is disposed at the first X-coordinate position corresponding to a center of the first irradiation unit, and the second light receiving unit for the second irradiation unit is disposed at the second X-coordinate position corresponding to a center of the second irradiation unit.

Thus, when the irradiation section and the light receiving section are composed of a plurality of units, it becomes possible to make the positions in which the respective units are disposed correspond to each other. Similarly to the case described above, in particular, in the case in which a retroreflective member is used in the input device, it becomes possible for each of the units to receive intensive reflected light. Further, by providing a plurality of irradiation units, it becomes possible to obtain the position information of the input device from only the angle information without obtaining the distance information from the irradiation section (or light receiving section).

The aspect of the invention may be configured such that a coordinate axis perpendicular to a target surface along a detection area of the input device is defined as a Z-coordinate axis, the light receiving section includes a first light receiving unit disposed at a first Z-coordinate position, and a second light receiving unit disposed at a second Z-coordinate position that is different from the first Z-coordinate position, the first light receiving unit receives the reflected light from the first reflecting section, and the second light receiving unit receives the reflected light from the second reflecting section.

Thus, the movement amount information and the rotation amount information can be obtained using the two light receiving units disposed at different Z-coordinate positions.

The aspect of the invention may be configured such that the light receiving section includes a third light receiving unit disposed at a third Z-coordinate position that is different from the first Z-coordinate position and the second Z-coordinate position, the first light receiving unit receives the reflected light from a first part of the first reflecting section, and the third light receiving unit receives the reflected light from a second part of the first reflecting section.

Thus, the movement amount information and the rotation amount information can be obtained using the three light receiving units disposed at different Z-coordinate positions.

The aspect of the invention may be configured such that the first reflecting section and the second reflecting section are retroreflective members which return intensive reflected light toward a light source.

Thus, since it become possible to return the intensive light to the detection section in the case in which the incident direction of the incident light and the direction in which the detection section is located coincide with each other, it becomes possible to increase the signal value to be detected.

Another aspect of the invention is directed to a pen-shaped input device including a first reflecting section enabling detection of movement amount information of one of the pen-shaped input device and a part of the pen-shaped input device in a longitudinal direction, and the first reflecting section has a reflectance varying in the longitudinal direction.

According to this aspect of the invention, it is possible to realize the pen-shaped input device having a reflecting section with the reflectance varying in the longitudinal direction, and capable of detecting the movement amount information in the longitudinal direction.

The aspect of the invention may be configured such that the pen-shaped input device further includes a second reflecting section enabling detection of rotation amount information of the pen-shaped input device, and the second reflecting section has a reflectance varying in a rotational direction around an axis extending in the longitudinal direction.

According to this configuration, it is possible to realize the pen-shaped input device having a reflecting section with the reflectance varying in the rotational direction, and capable of detecting the rotation amount information in the rotational direction.

The aspect of the invention may be configured such that there are further included a first part, and a second part disposed on a pen tip side of the input device, the first reflecting section is located at the first part, and the second reflecting section is located at the second part.

Thus, it becomes possible to respectively provide the first reflecting section and the second reflecting section to the separate parts on the pen-shaped input device.

Still another aspect of the invention is directed to a pen-shaped input device including a reflecting section enabling detection of rotation amount information of the pen-shaped input device in a rotational direction around an axis extending in a longitudinal direction of the pen-shaped input device, and the reflecting section has a reflectance varying in the rotational direction.

According to this aspect of the invention, it is possible to realize the pen-shaped input device having a reflecting section with the reflectance varying in the rotational direction, and capable of detecting the rotation amount information in the rotational direction.

BRIEF DESCRIPTION OF THE DRAWINGS

The invention will be described with reference to the accompanying drawings, wherein like numbers reference like elements.

DESCRIPTION OF AN EXEMPLARY EMBODIMENT

Figure 1:
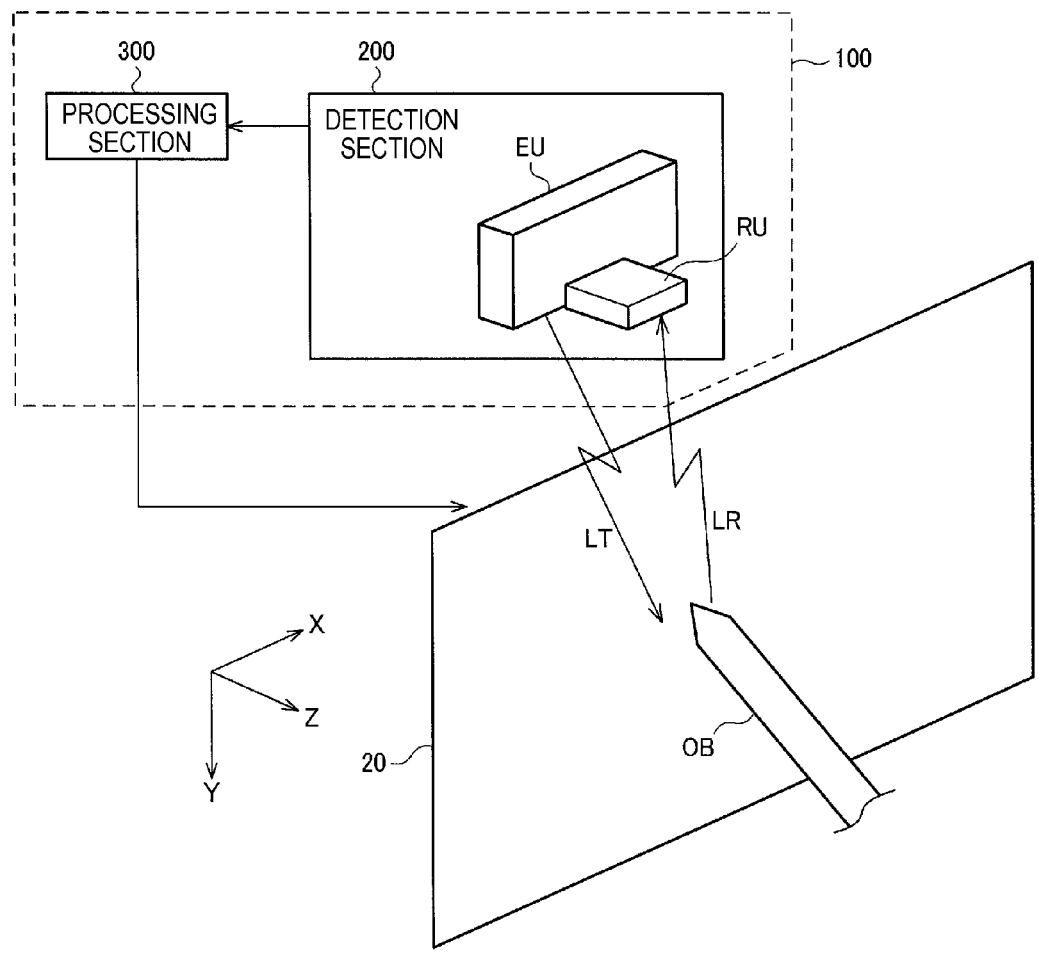
FIG. 1 is a diagram showing a configuration example of an optical position detection device according to an embodiment of the invention.

Hereinafter, an embodiment of the invention will be explained. It should be noted that the present embodiment described below does not unreasonably limit the contents of the invention as set forth in the appended claims. Further, all of the constituents described in the present embodiment are not necessarily essential elements of the invention.

1. Method of Present Embodiment

Firstly, a method of the present embodiment will be explained. In recent years, an input system such as an electronic blackboard system has become widely known. In the electronic blackboard system, by moving an input device on a target surface (a whiteboard), it is possible to draw characters and figures, or to perform a process coordinated with the data displayed on the target surface.

However, the electronic blackboard system is for obtaining two-dimensional position information of the input device (e.g., in the case in which the input device is a pen-shaped input device, a contact point between the pen tip and the target surface), and three-dimensional position information such as pressing or rotation of the input device, or tilt of the input device is not considered.

Further, as shown in JP-A-2004-205962, there is proposed a calligraphy learning system utilizing the kinesthetic sense. In this system, it is possible to reflect not only the position of the brush tip but also information of the tilt of the entire brush and so on to the input. However, there arises a problem that the system becomes too large-, and in addition, an odd feeling arises in the user as compared to when the user normally moves the brush.

Therefore, the inventors propose the following method. Not only the two-dimensional position information of the input device but also the three-dimensional position information is obtained using a position detection device. Then, the three-dimensional position information (e.g., the displacement in the longitudinal direction of the input device, the rotation amount around an axis along the longitudinal direction, and the tilt) thus obtained is used as the information when performing the input. Specifically, it can be applied to, for example, a calligraphy learning system. By taking the displacement in the longitudinal direction, the rotation amount in the rotational direction, the tilt, and so on into consideration, it becomes possible to reproduce the expressions of the stopping stroke, the flick stroke, the pullout stroke, and so on unique to calligraphy on a computer. It should be noted that it is assumed here that an optical position detection device is used as the position detection device.

Hereinafter, the details will be explained. Firstly, a configuration example of the optical position detection device and the coordinate detection method used in the present embodiment will be explained. Then, a method of obtaining the three-dimensional position information of the input device using the optical position detection device will be described. Specifically, a configuration example of the input device, a configuration example of a light receiving unit of the optical position detection device, and a data acquisition method will be explained, and then a calligraphy learning system will finally be described as a specific example.

2. Configuration Example of Optical Position Detection Device

FIG. 1 shows a basic configuration example of the optical position detection device 100 according to the input system of the present embodiment. The optical position detection device shown in FIG. 1 includes a detection section 200 and a processing section 300, and the detection section 200 includes an irradiation section EU and a light receiving section RU. It should be noted that the optical detection system of the present embodiment is not limited to the configuration shown in FIG. 1, and can be put into practice in variously modified forms such as elimination of some of the constituents, replacement with other constituents, or addition of other constituents.

It should be noted that the input system is not limited to the configuration realized by using the optical position detection device 100 including the detection section 200 and the processing section 300. It is also possible that the functions of the detection section 200 and the processing section 300 are realized by an information processing device (e.g., a PC), and the input system is realized by the irradiation section EU, the light receiving section RU, and the information processing device coordinating with each other.

Based on a result of reception of the reflected light LR caused by an object OB (the input device in the input system according to the present embodiment) reflecting the irradiation light LT, the detection section 200 detects object information (e.g., coordinate information and reflectance information) of the object OB. Specifically, in the case in which, for example, the detection area RDET, which is an area where the object OB is detected, is an area along an X-Y plane, the detection section 200 detects at least the X-coordinate information and the Y-coordinate information of the object OB existing in the detection area RDET. It should be noted that the method of detecting the coordinate information performed by the detection section 200 will be described later. Further, specifically, the reflectance information as the information regarding the reflectance of the object OB is detected.

The detection area RDET is an area (region) where the object OB is detected, and is specifically, for example, the area in which the light receiving section RU can receive the reflected light LR caused by the object OB reflecting the irradiation light LT to thereby detect the object OB. More specifically, the detection area is the area where the light receiving section RU can receive the reflected light LR to thereby detect the object OB, and the detection accuracy in the allowable range can be assured.

The processing section 300 performs various processes based on the object information detected by the detection section 200. The function of the processing section 300 can be realized by, for example, a processor such as a CPU and a program executed by the processor, or a dedicated IC.

The irradiation section EU emits the irradiation light LT to the detection area RDET. As described later, the irradiation section EU includes a light source section formed of a light emitting element such as a light emitting diode (LED), and emits, for example, infrared light (near infrared ray near to the visible range) due to the light source section emitting light.

The light receiving section RU receives the reflected light LR caused by the object OB reflecting the irradiation light LT. The light receiving section RU can include a plurality of light receiving units PD. As the light receiving unit PD, a photodiode, a phototransistor, and so on can be used.

Figure 2:
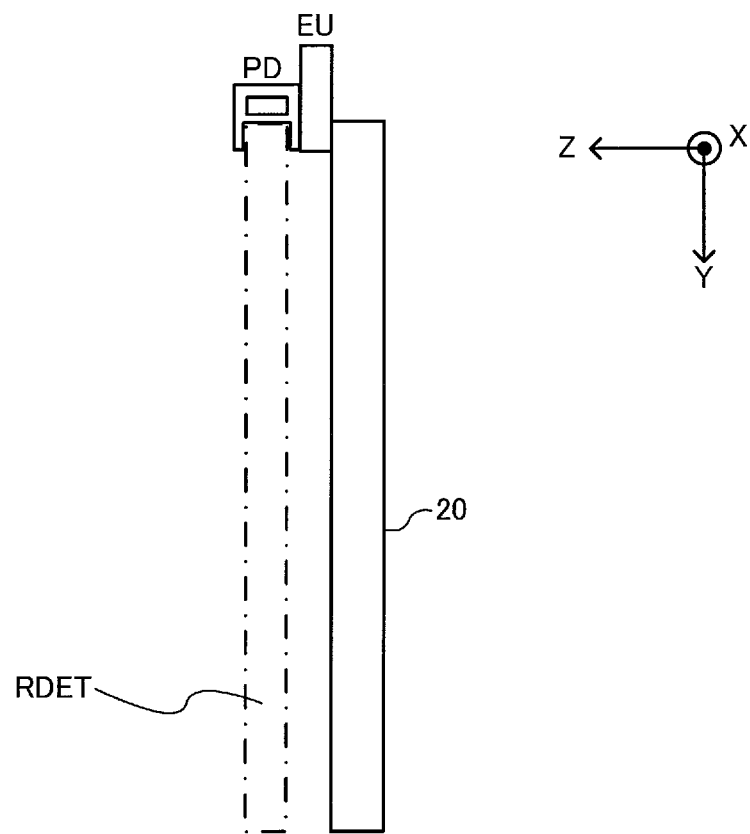
FIG. 2 is a diagram showing a configuration example of a light receiving section.

FIG. 2 shows a specific configuration example of the light receiving section RU of the present embodiment. In the configuration example shown in FIG. 2, the light receiving section RU includes the light receiving unit PD. The light receiving unit PD is provided with a slit (incident light restriction section) or the like for restricting the angle (the angle on a Y-Z plane) at which the incident light enters, and receives the reflected light LR from the object OB existing in the detection area RDET. The detection section 200 detects the X-coordinate information and the Y-coordinate information based on the light reception result of the light receiving unit PD. It should be noted that the irradiation section EU emits the irradiation light LT to the detection area RDET. Further, the detection area RDET is an area along the X-Y plane. It should be noted that although the configuration example shown in FIG. 2 is composed of a single light receiving unit, a configuration including two or more light receiving units can also be adopted.

Figure 3A:
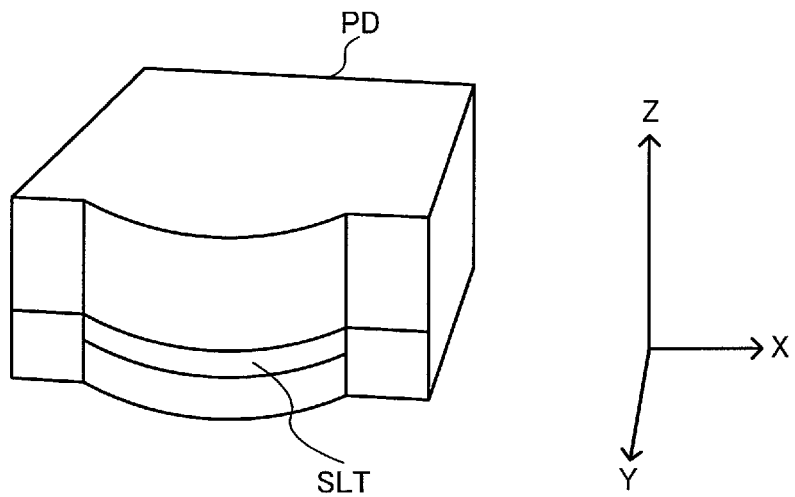
FIGS. 3A and 3B are diagrams showing a configuration example of a light receiving unit.
Figure 3B:
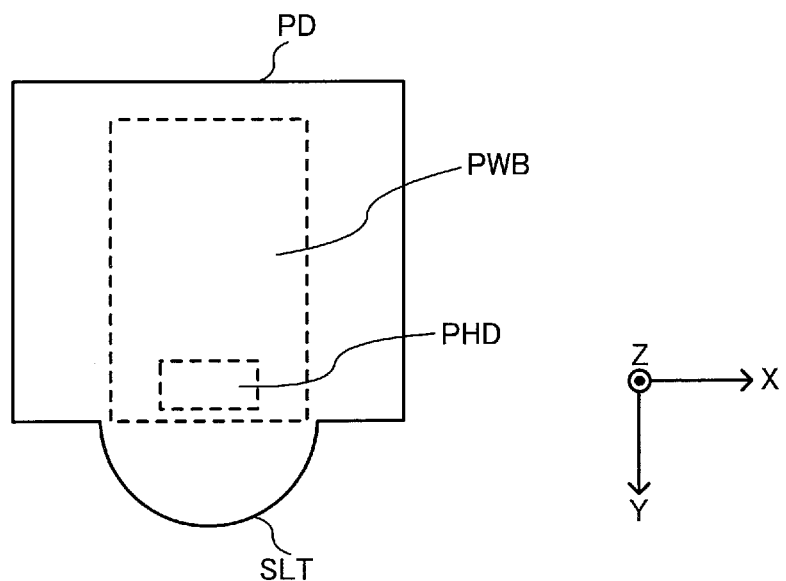

FIGS. 3A and 3B show a configuration example of the light receiving unit PD having the slit SLT (the incident light restriction section). As shown in FIG. 3A, the slit SLT is disposed on the front surface of the light receiving element PHD to thereby limit the incident light entering the light receiving unit PD. The slit SLT is disposed along the X-Y plane, and is capable of limiting the angle in the Z direction in which the incident light enters. In other words, the light receiving unit PD is capable of receiving the incident light entering at a predetermined angle defined by the slit width of the slit SLT.

FIG. 3B is a plan view of the light receiving unit having the slit SLT viewed from the above. A wiring board PWB is disposed inside a housing (case) made of, for example, aluminum, and the light receiving element PHD is mounted on the wiring board PWB.

Figure 4:
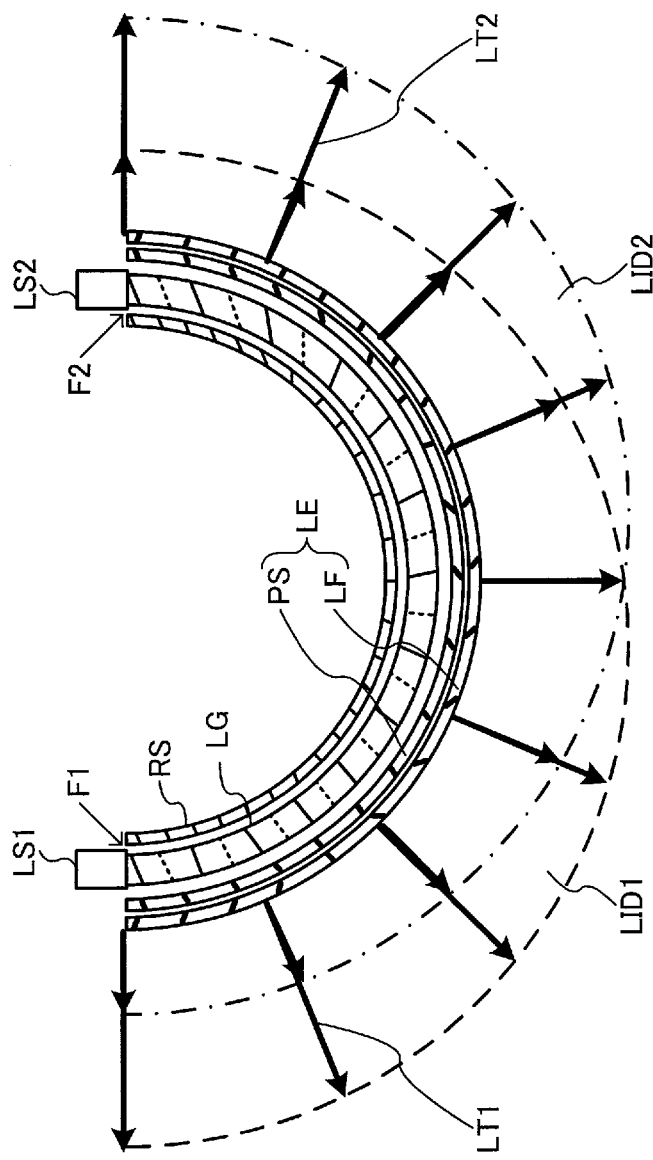
FIG. 4 is a diagram showing a configuration example of an irradiation section.

FIG. 4 shows a detailed configuration example of the irradiation section EU of the present embodiment. The irradiation section EU of the configuration example shown in FIG. 4 includes the light source sections LS1, LS2, a light guide LG, and an irradiation direction setting section LE. Further, a reflecting sheet RS is also included. Further, the irradiation direction setting section LE includes an optical sheet PS and a louver film LF. It should be noted that the irradiation section EU of the present embodiment is not limited to the configuration shown in FIG. 4, and can be put into practice in various modified forms such as elimination of some of the constituents, replacement with other constituents, or addition of other constituents.

The light source sections LS1, LS2 are for emitting the source light beams, and each is provided with a light emitting element such as a light emitting diode (LED). The light source sections LS1, LS2 each emit the source light of, for example, an infrared light (a near infrared ray near to the visible light range). That is, it is preferable that the source light emitted by each of the light source sections LS1, LS2 is the light in the wavelength band with which the light is effectively reflected by the object such as a finger of the user or a stylus pen, or the light in the wavelength band with which the light is hardly included in the environment light to be the disturbance light. Specifically, the source light is an infrared light with the wavelength around 850 nm, which is the light in the wavelength band with high reflectance on the surface of a human body, or an infrared light with the wavelength around 950 nm, which is the light in the wavelength band with which the light beam hardly included in the environment light.

The light source section LS1 is disposed on one end of the light guide LG as indicated by the symbol F1 in FIG. 4. Further, the second light source section LS2 is disposed on the other end of the light guide LG as indicated by the symbol F2. Further, the light source section LS1 emits the source light toward the light entrance surface of the one end (F1) of the light guide LG to thereby emit the irradiation light LT1, and form (set) the first irradiation light intensity distribution LID1 in the detection area of the object. Meanwhile, the light source section LS2 emits the second source light toward the light entrance surface of the other end (F2) of the light guide LG to thereby emit the second irradiation light LT2, and form the second irradiation light intensity distribution LID2 with different intensity distribution from the first irradiation light intensity distribution LID1 in the detection area. As described above, the irradiation section EU is capable of emitting the irradiation light having the intensity distribution varying in accordance with the position in the detection area RDET.

The light guide LG (the light guide member) is for guiding the source light emitted by the light source sections LS1, LS2. For example, the light guide LG has a curved shape, and guides the source light from the light source sections LS1, LS2 along a curved light guide path. Specifically, in FIG. 4, the light guide LG has a circular arc shape. It should be noted that although the light guide LG has the circular arc shape with the central angle of 180 degrees in FIG. 4, it is also possible for the light guide LG to have a circular arc shape with the central angle smaller than 180 degrees. The light guide LG is formed of a transparent resin member made of, for example, acrylic resin or polycarbonate.

On at least one of the outer circumferential side and the inner circumferential side of the light guide LG, there is performed a process for adjusting the light emission efficiency of the source light from the light guide LG. As the method of the process, there can be adopted various methods such as a serigraphy method for printing reflecting dots, a molding method for providing a concavo-convex shape using a stamper or injection, and a groove processing method.

The irradiation direction setting section LE realized with a prism sheet as the optical sheet PS and the louver film LF is disposed on the outer circumferential side of the light guide LG, and receives the source light emitted from the outer circumferential side (the outer circumferential surface) of the light guide LG. Then, the irradiation direction setting section LE emits the irradiation lights LT1, LT2 having the irradiation direction set to the direction from the inner circumferential side to the outer circumferential side of the light guide LG having the curved shape (the circular arc shape). In other words, the irradiation direction setting section LE sets (restricts) the direction of the source lights emitted from the outer circumferential side of the light guide LG to the irradiation direction along, for example, the normal direction (the radial direction) of the light guide LG. Thus, the irradiation lights LT1, LT2 are emitted radially, in the direction from the inner circumferential side toward the outer circumferential side of the light guide LG.

The setting of the irradiation directions of the irradiation lights LT1, LT2 described above is realized by the prism sheet PS and the louver film LF of the irradiation direction setting section LE. For example, the prism sheet PS raises the direction of the source light, which is emitted from the outer circumferential side of the light guide LG with a low viewing angle, toward the normal direction to thereby set the direction so that the peak of the light emission characteristics is in the normal direction. Further, the louver film LF blocks (cuts) the light (low-viewing angle light) in the direction other than the normal direction.

As described above, according to the irradiation section EU of the present embodiment, the light source sections LS1, LS2 are respectively disposed on both ends of the light guide LG, and are made to light alternately, thereby making it possible to form two irradiation light intensity distributions. In other words, the irradiation light intensity distribution LID1 having the higher intensity on the one end of the light guide LG and the irradiation light intensity distribution LID2 having the higher intensity on the other end of the light guide LG can be formed alternately.

By forming such irradiation light intensity distributions LID1, LID2, and receiving the reflected lights of the object due to the irradiation lights with these intensity distributions, it becomes possible to detect the object with higher accuracy while suppressing the influence of the disturbance light such as the environment light to the minimum. In other words, it becomes possible to cancel out the infrared component included in the disturbance light, and therefore, it becomes possible to suppress the harmful influence of the infrared component exerted on the detection of the object to the minimum.

3. Coordinate Detection Method With Optical Position Detection Device

Figure 5A:
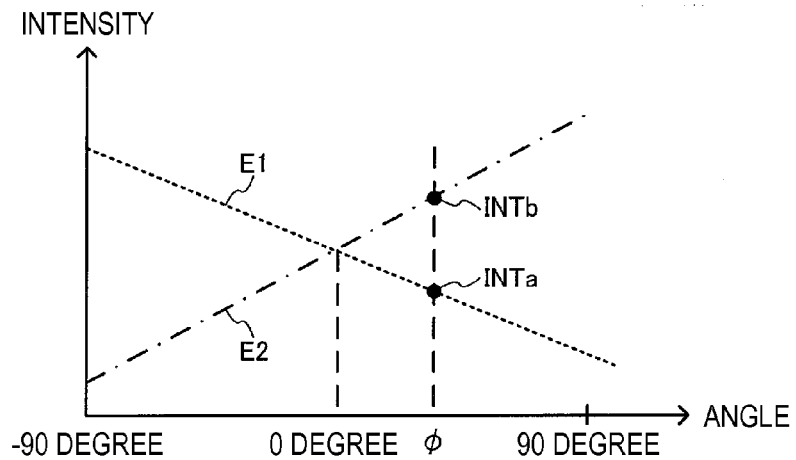
FIGS. 5A and 5B are diagrams for explaining a method of detecting coordinate information.
Figure 5B:
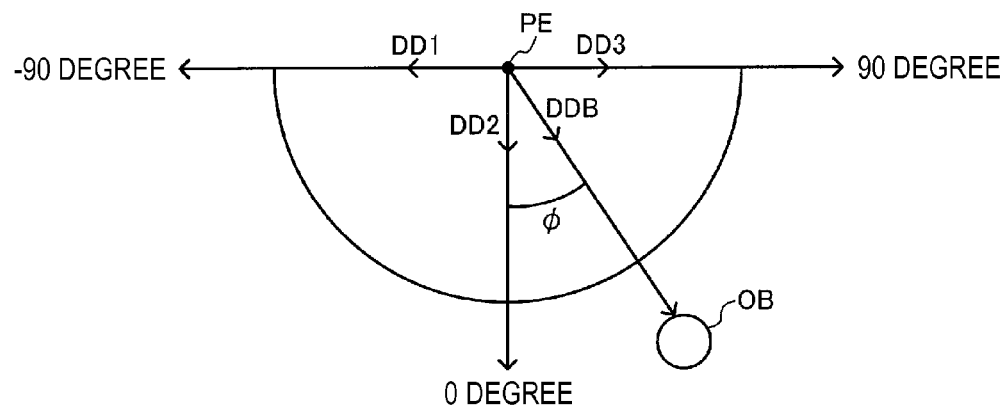

FIGS. 5A and 5B are diagrams for explaining a coordinate information detection method with the optical position detection device 100 available in the input system according to the present embodiment.

The line E1 in FIG. 5A represents the relationship between the angle of the irradiation direction of the irradiation light LT1 and the intensity of the irradiation light LT1 at that angle in the irradiation light intensity distribution LID1 shown in FIG. 4. According to the line E1 in FIG. 5A, the intensity becomes the highest in the case in which the irradiation direction is the direction (leftward) of DD1 in FIG. 5B. In contrast, the intensity becomes the lowest in the case in which the irradiation direction is the direction (rightward) of DD3, and in the case of the direction of DD2, the intensity takes the value intermediate therebetween. Specifically, in accordance with the variation in the angle from the direction DD1 to the direction DD3, the intensity of the irradiation light decreases monotonically, for example, varies linearly. It should be noted that in FIG. 5B the center position of the circular arc shape of the light guide LG corresponds to the setup position PE of the irradiation section EU.

Further, the line E2 in FIG. 5A represents the relationship between the angle of the irradiation direction of the irradiation light LT2 and the intensity of the irradiation light LT2 at that angle in the irradiation light intensity distribution LID2 shown in FIG. 4. According to the line E2 in FIG. 5A, the intensity becomes the highest in the case in which the irradiation direction is the direction of DD3 in FIG. 5B. In contrast, the intensity becomes the lowest in the case in which the irradiation direction is the direction of DD1, and in the case of the direction of DD2, the intensity takes the value intermediate therebetween. Specifically, in accordance with the variation in the angle from the direction DD3 to the direction DD1, the intensity of the irradiation light decreases monotonically, for example, varies linearly. It should be noted that although in FIG. 5A the relationship between the angle of the irradiation direction and the intensity is assumed to be a linear relationship, the present embodiment is not limited to this configuration, but a hyperbolic relationship, for example, can also be adopted.

Further, it is assumed that the object OB exists in the direction DDB at an angle $\phi$ as shown in FIG. 5B. Then, in the case (the case of E1) in which the light source section LS1 emits light to thereby form the irradiation light intensity distribution LID1, the intensity at the position of the object OB existing in the direction of DDB (angle $\phi$) becomes INTa as shown in FIG. 5A. On the other hand, in the case (the case of E2) in which the light source section LS2 emits light to thereby form the irradiation light intensity distribution LID2, the intensity at the position of the object OB existing in the direction of DDB becomes INTb.

Figure 6A:
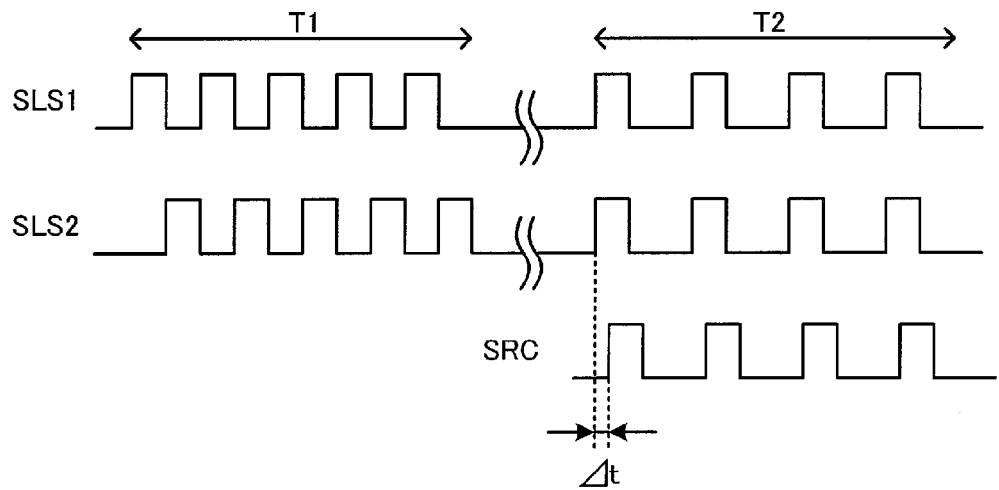
FIGS. 6A and 6B are diagrams showing an example of signal waveform of a light emission control signal.

Therefore, the direction DDB (the angle $\phi$) in which the object OB is located can be identified by obtaining the relationship between these intensity values INTa, INTb. Further, by obtaining the distance of the object OB from the setup position PE of the optical position detection device using, for example, the method shown in FIGS. 6A and 6B described later, the location of the object OB can be identified based on the distance thus obtained and the direction DDB. Alternatively, if two irradiation units EU1, EU2 are provided as the irradiation section EU, and the directions DDB1 ($\phi$1), DDB2 ($\phi$2) of the object OB with respect to the irradiation units EU1, EU2 are obtained as shown in FIG. 7 described later, the position of the object OB can be identified using these directions DDB1, DDB2 and the distance DS between the irradiation units EU1, EU2.

In order to obtain the relationship between these intensity values INTa, INTb, in the present embodiment the light receiving section RU receives the reflected light (a first reflected light) of the object OB when forming the irradiation light intensity distribution LID1. Assuming that the detected light reception amount of the reflected light in this case is Ga, the value Ga will correspond to the intensity INTa. Further, the light receiving section RU receives the reflected light (a second reflected light) of the object OB when forming the irradiation light intensity distribution LID2. Assuming that the detected light reception amount of the reflected light in this case is Gb, the value Gb will correspond to the intensity INTb. Therefore, if the relationship between the detected light reception amounts Ga, Gb is obtained, the relationship between the intensity values INTa, INTb is obtained, and thus the direction DDB in which the object OB is located can be obtained.

For example, the control amount (e.g., the current amount), the conversion coefficient, and the light emission amount of the light source section LS1 are denoted by Ia, k, and Ea, respectively. Further, the control amount (e.g., the current amount), the conversion coefficient, and the light emission amount of the light source section LS2 are denoted by Ib, k, and Eb, respectively. Then, Formulas 1 and 2 below are obtained.

$$Ea = k \cdot Ia \qquad (1)$$

$$Eb = k \cdot Ib \qquad (2)$$

Further, the damping factor of the source light (the first source light) from the light source section LS1 is denoted by fa, and the detected light reception amount of the reflected light (the first reflected light) corresponding to the source light is denoted by Ga. Further, the damping factor of the source light (the second source light) from the light source section LS2 is denoted by fb, and the detected light reception amount of the reflected light (the second reflected light) corresponding to the source light is denoted by Gb. Then, Formulas 3 and 4 below are obtained.

$$Ga = fa \cdot Ea = fa \cdot k \cdot Ia \qquad (3)$$

$$Gb = fb \cdot Eb = fb \cdot k \cdot Ib \qquad (4)$$

Therefore, the ratio between the detected light reception amounts Ga, Gb can be expressed as Formula 5 below.

$$Ga/Gb = (fa/fb) \cdot (Ia/Ib) \qquad (5)$$

Here, Ga/Gb can be identified from the light reception result in the light receiving section RU, and the Ia/Ib can be identified from the control amount of the irradiation section EU. Further, the intensity values INTa, INTb shown in FIG. 5A and the damping factors fa, fb are in unique relationships, respectively. For example, the case in which the damping factors fa, fb have small values, and the attenuation amounts are large means that the intensity values INTa, INTb are small. In contrast, the case in which the damping factors fa, fb have large values, and the attenuation amounts are small means that the intensity values INTa, INTb are large. Therefore, by obtaining the ratio fa/fb of the damping factors using Formula 5 above, it becomes possible to obtain the direction, the location, and so on of the object.

More specifically, one control amount Ia is fixed to Im, and then the other control amount Ib is controlled so that the ratio Ga/Gb of the detected light reception amounts becomes 1. For example, the control of lighting the light source sections LS1, LS2 alternately with the phases reverse to each other is performed, the waveform of the detected light reception amount is analyzed, and then the other control amount Ib is controlled so that the detected waveform is not observed (so that Ga/Gb=1 is fulfilled). Then, the ratio fa/fb of the damping factors is obtained from the other control amount Ib=Im·(fa/fb) to thereby obtain the direction, the location, and so on of the object.

Further, it is also possible to perform the control so that Ga/Gb=1 is fulfilled, and at the same time, the sum of the control amounts Ia, Ib becomes constant as expressed by Formulas 6 and 7 below.

$$Ga/Gb = 1 \qquad (6)$$

$$Im = Ia + Ib \qquad (7)$$

By substituting Formulas 6 and 7 into Formula 5 above, Formula 8 below is obtained.

$$Ga/Gb = 1 \qquad (8)$$
$$= (fa/fb) \cdot (Ia/Ib)$$
$$= (fa/fb) \cdot \{(Im - Ib)/Ib\}$$

According to Formula 8 above, Ib is expressed as Formula 9 below.

$$Ib = \{fa/(fa+fb)\} \cdot Im \qquad (9)$$

Here, $\alpha = fa/(fa+fb)$ is defined, Formula 9 above is expressed as Formula 10 below, and the ratio fa/fb of the damping factors is expressed as Formula 11 below using $\alpha$.

$$Ib = \alpha \cdot Im \qquad (10)$$

$$fa/fb = \alpha/(1-\alpha) \qquad (11)$$

Therefore, if the control is performed so that Ga/Gb=1 is fulfilled and at the same time the sum of the control amounts Ia, Ib becomes a constant value Im, the ratio fa/fb of the damping factors can be obtained by obtaining $\alpha$ using Formula 10 above from the control amount Ib and the constant value Im at that moment, and then substituting $\alpha$ thus obtained into Formula 11 above. Thus, it becomes possible to obtain the direction, the location, and so on of the object. Further, by performing the control so that Ga/Gb=1 is fulfilled, and at the same time, the sum of the control amounts Ia, Ib becomes the constant value, it becomes possible to cancel out the influence of the disturbance light, and thus the improvement of the detection accuracy can be achieved.

Next, an example of a method of detecting the coordinate information of the object using the optical detection system of the present embodiment will be explained. FIG. 6A shows a signal waveform example regarding the light emission control of the light source sections LS1, LS2. The signal SLS1 is a light emission control signal for the light source section LS1, the signal SLS2 is a light emission control signal for the light source section LS2, and these signals SLS1, SLS2 are signals with phases reverse to each other. Further, the signal SRC is a light reception signal.

For example, the light source section LS1 lights (emits light) when the signal SLS1 is in the H level, and stops lighting when the signal SLS1 is in the L level. Further, the light source section LS2 lights (emits light) when the signal SLS2 is in the H level, and stops lighting when the signal SLS2 is in the L level. Therefore, in the first period T1 in FIG. 6A, it is arranged that the light source sections LS1, LS2 light alternately. In other words, the light source section LS2 stop lighting during the period in which the light source LS1 is lighting. Thus, the irradiation light intensity distribution LID1 shown in FIG. 4 is formed. On the other hand, the light source section LS1 stop lighting during the period in which the light source LS2 is lighting. Thus, the irradiation light intensity distribution LID2 shown in FIG. 4 is formed.

As described above, the detection section 200 performs the control of making the light source section LS1 and the light source section LS2 light (emit light) alternately in the first period T1. Further, in the first period T1, the direction in which the object is located viewed from the optical position detection device (the irradiation section) is detected. Specifically, the light emission control of, for example, fulfilling Ga/Gb=1 and making the sum of the control amounts Ia, Ib constant as expressed by Formulas 6 and 7 is performed in the first period T1. Further, as shown in FIG. 5B, the direction DDB in which the object OB is located is obtained. For example, the ratio fa/fb of the damping factors is obtained from Formulas 10 and 11, and then the direction DDB in which the object OB is located is obtained using the method explained with reference to FIGS. 5A and 5B.

Then, in the second period T2 subsequent to the first period T1, the distance (the distance in the direction along the direction DDB) to the object OB is detected based on the light reception result in the light receiving section RU. Then, the location of the object OB is detected based on the distance and the direction DDB of the object OB thus detected. Specifically, in FIG. 5B, by obtaining the distance from the setup position PE of the optical position detection device to the object OB and the direction DDB in which the object OB is located, the X, Y-coordinate positions of the object OB can be identified. As described above, by obtaining the distance from the temporal difference between the light emission timing of the light source and the light reception timing, and then combining the result with the result of the angle, the location of the object OB can be identified.

Specifically, in FIG. 6A, the time $\Delta t$ from the light emission timing of the light source sections LS1, LS2 due to the light emission control signals SLS1, SLS2 to the timing (the timing at which the reflected light is received) at which the light reception signal SRC is activated is detected. In other words, the time $\Delta t$ until the light from the light source sections LS1, LS2 is reflected by the object OB and then received by the light receiving section RU is detected. By detecting the time $\Delta t$, the distance to the object OB can be detected since the speed of light is given. Specifically, the shift amount (time) in the arrival time of the light is measured, and the distance is obtained using the speed of light.

It should be noted that since the speed of light is rather high, there is also a problem that it is difficult to obtain the simple difference to thereby detect the time $\Delta t$ simply by using the electrical signals. In order to solve such a problem, it is desirable to perform modulation of the light emission control signal as described in FIG. 6B. Here, FIG. 6B shows a schematic signal waveform example schematically representing the light intensity (the current amount) by the amplitude of the control signals SLS1, SLS2.

Figure 6B:
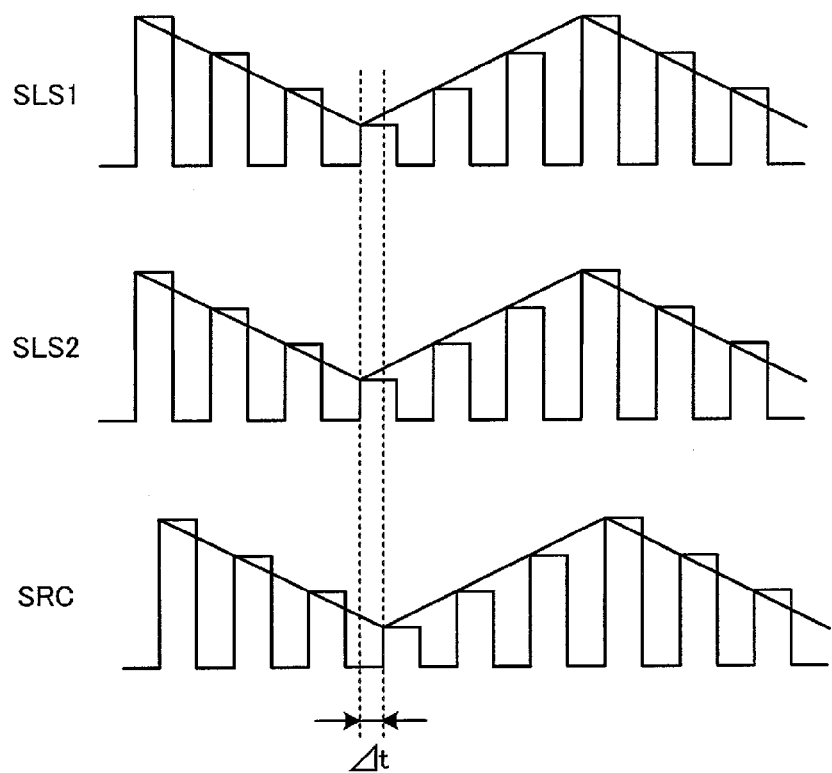
Figure 7:
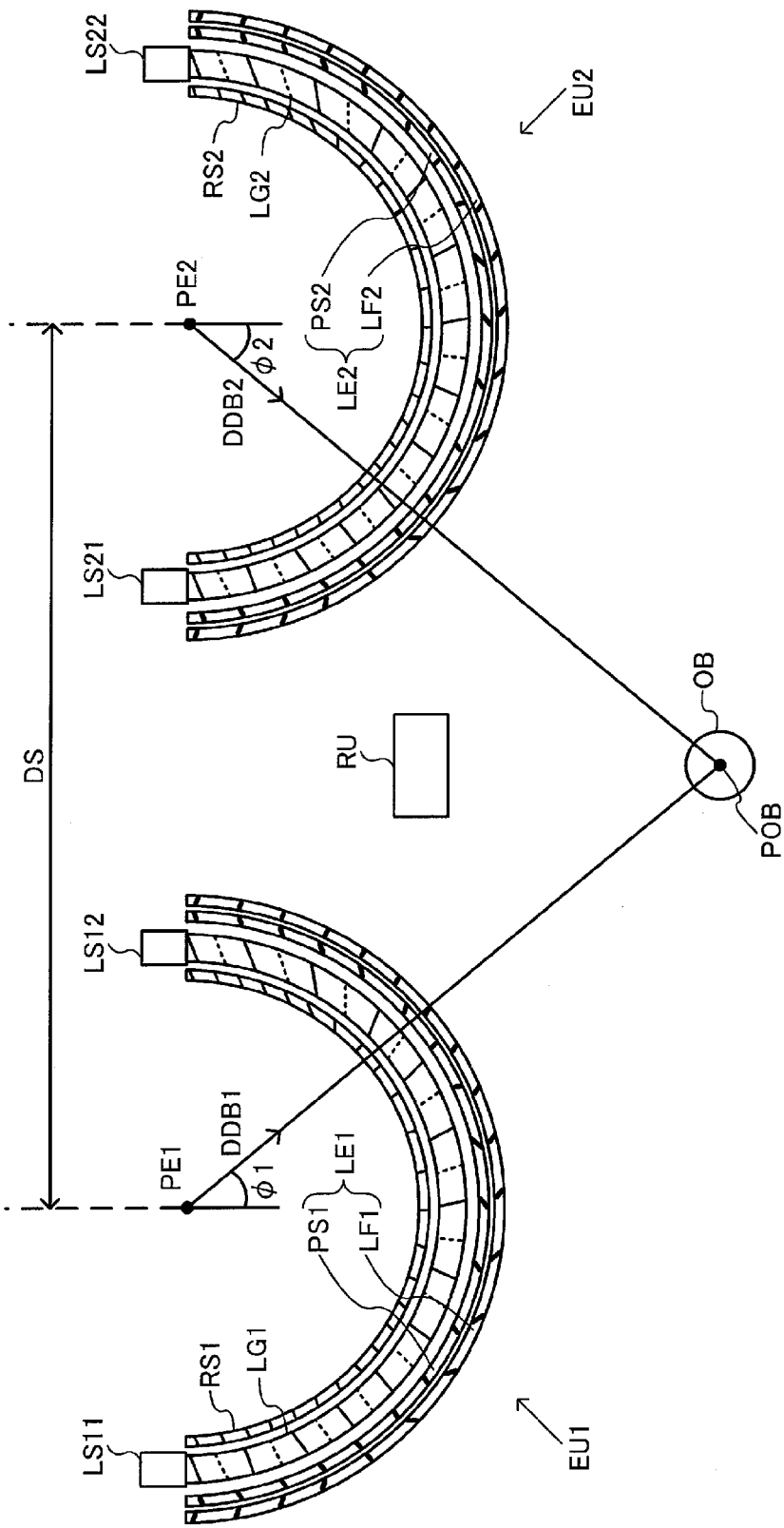
FIG. 7 is a diagram showing another configuration example of the irradiation section.

Specifically, in FIG. 6B, the distance is detected using, for example, a known time-of-flight (TOF) method of the continuous wave modulation. In the continuous wave modulation TOF method, the continuous light intensity-modulated with a continuous wave with a constant period is used. Then, by irradiating the object with the intensity-modulated light, and receiving the reflected light a plurality of times at time intervals shorter than the modulation period, the waveform of the reflected light is demodulated, and by obtaining the phase difference between the irradiation light and the reflected light, the distance is detected. It should be noted that in FIG. 6B, it is also possible to perform the intensity modulation on only the light corresponding to either one of the control signals SLS1, SLS2. Further, a waveform modulated with a continuous triangular wave or a sine wave instead of the clock waveform shown in FIG. 6B can also be adopted. Further, it is also possible to detect the distance by a TOF method of pulse modulation using pulsed light as the continuously modulated light. The distance detection method is disclosed in detail in, for example, JP-A-2009-8537.

FIG. 7 shows a modified example of the irradiation section EU of the present embodiment. In FIG. 7, as the irradiation section EU, there are provided first and second irradiation units EU1, EU2. These first and second irradiation units EU1, EU2 are disposed with a predetermined distance DS in the direction along the plane of the detection area RDET for the object OB. In other words, the first and second irradiation units EU1, EU2 are disposed with the distance DS along the X-axis direction shown in FIG. 1.

The first irradiation unit EU1 radially emits the first irradiation light having the intensity varying in accordance with the irradiation direction. The second irradiation unit EU2 radially emits the second irradiation light having the intensity varying in accordance with the irradiation direction. The light receiving section RU receives a first reflected light caused by the object OB reflecting the first irradiation light from the first irradiation unit EU1, and a second reflected light caused by the object OB reflecting the second irradiation light from the second irradiation unit EU2. Subsequently, the detection section 200 detects the position POB of the object OB based on the light reception result in the light receiving section RU.

Specifically, the detection unit 200 detects the direction of the object OB with respect to the first irradiation unit EU1 as a first direction DDB1 (an angle $\phi 1$) based on the light reception result of the first reflected light. Further, the detection section 200 detects the direction of the object OB with respect to the second irradiation unit EU2 as a second direction DDB2 (an angle $\phi 2$) based on the light reception result of the second reflected light. Then, the position POB of the object OB is obtained based on the first direction DDB1 ($\phi 1$) and the second direction DDB2 ($\phi 2$) thus detected, and the distance DS between the first and second irradiation units EU1, EU2.

According to the modified example shown in FIG. 7, the position POB of the object OB can be detected without obtaining the distance between the optical position detection device and the object OB as obtained in FIGS. 6A and 6B.

Figure 19:
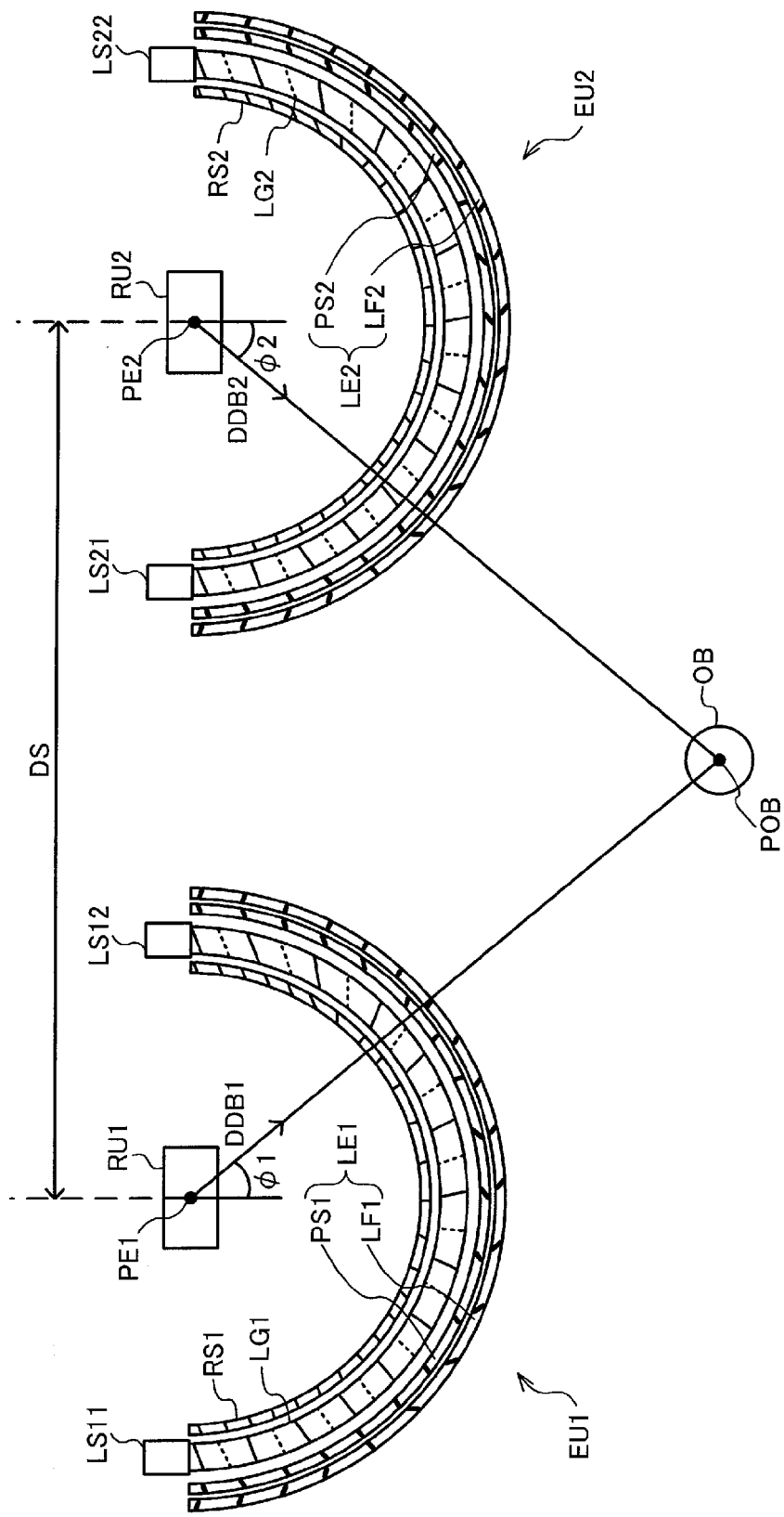
FIG. 19 is a diagram showing an example of disposing the light receiving section in a central portion of the irradiation section.

In the case of using the irradiation section EU (the first irradiation section EU1 and the second irradiation section EU2) having the configuration shown in FIG. 7, the position where the light receiving section RU is disposed is not limited to the example shown in FIG. 7. FIG. 19 shows another modified example. In FIG. 19, as the light receiving section RU, a light receiving unit RU1 for the first irradiation unit and a light receiving unit RU2 for the second irradiation unit are provided. The light receiving unit RU1 is disposed at the center of the first irradiation unit EU1, and the light receiving unit RU2 is disposed at the center of the second irradiation unit EU2.

Similarly to the case of FIG. 7, the first irradiation unit EU1 radially emits the first irradiation light with the intensity varying with the irradiation direction, and the second irradiation unit EU2 radially emits the second irradiation light with the intensity varying with the irradiation direction. The light receiving unit RU1 for the first irradiation unit receives a first reflected light caused by the object OB reflecting the first irradiation light, and the light receiving unit RU2 for the second irradiation unit receives a second reflected light caused by the object OB reflecting the second irradiation light. Subsequently, the detection section 200 detects the position POB of the object OB based on the light reception result in the light receiving section RU. The specific method is substantially the same as shown in FIG. 7.

In the present embodiment, as described later, the object OB is provided with a reflecting section formed of a retroreflective member, and it is assumed that the light receiving section RU receives the reflected light caused by the reflecting section reflecting the irradiation light. Here, the retroreflective member denotes a member for returning an intensive reflected light in the direction in which the light has entered the reflecting member. Since more intensive reflected light received by the light receiving section RU causes a greater signal value (e.g., the current value) detected by the detector 200, in view of the fact that an advantage of high resistance to noise is obtained, the retroreflective member returning the intensive reflected light in a specific direction is useful. It should be noted that in order to effectively use the retroreflective member the light receiving section RU should be disposed in the direction in which the reflected light is returned. In other words, it is desirable that the direction in which the irradiation section EU is disposed and the direction in which the light receiving section RU is disposed coincide with each other when viewed from the object OB. The example shown in FIG. 19 is an example, and by disposing the light receiving units RU1, RU2 at the positions shown in FIG. 19, it becomes possible to receive the intensive reflected light from the object OB, and thus the detection accuracy of the position POB of the object OB can be improved compared to the example shown in FIG. 7.

Figure 20:
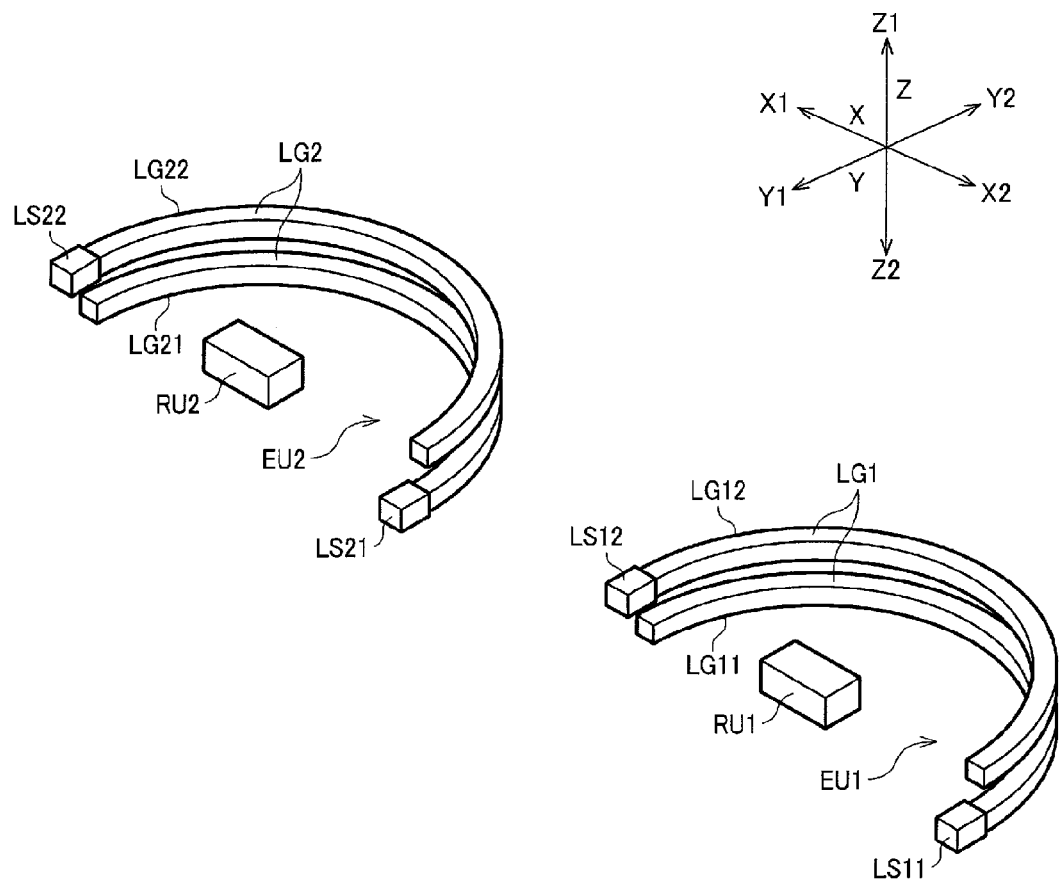
FIG. 20 is a diagram showing an example of providing one irradiation unit with two light guides.

Further, FIG. 20 shows a modified example of the device shown in FIG. 19. FIG. 20 is a diagram showing an example of providing one irradiation unit with two light guides. Since the first irradiation unit EU1 and the second irradiation unit EU2 have substantially the same configurations, the first irradiation unit EU1 will be explained here. In the example shown in FIG. 19 (and also in the example shown in FIG. 7), the light guide LG1 alone is commonly used as the light guide used when the light source LS11 emits light and the light guide used when the light source LS12 emits light. In contrast, in FIG. 20, two light guides LG11 and LG22 are disposed at positions that are different from each other in the Z-axis direction. The light guide LG11 is used when the light source LS11 emits light, and the light guide LG12 is used when the light source LS12 emits light.

According to the modified example shown in FIG. 20, since a plurality of light guides is disposed at respective positions that are different from each other in the Z-axis direction, detection of the Z-coordinate information also becomes possible in addition to the detection of the X-coordinate information and the Y-coordinate information.

4. Acquisition of Three-Dimensional Position Information of Input Device

Next, a method of obtaining three-dimensional position information of the input device will be explained. Specifically, a configuration example of the input device, a configuration example of the light receiving unit, and a specific example of a data acquisition method and an application will be described.

4.1 Configuration Example of Input Device

Figure 8:
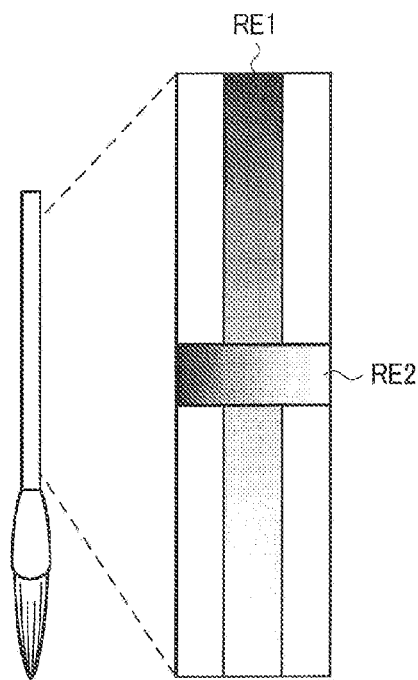
FIG. 8 is a configuration example of an input device used in the present embodiment.

FIG. 8 shows an example of the input device used in the present embodiment. FIG. 8 shows an example of the input device and an enlarged view of the reflecting section provided to a grip portion of the input device. Although a pen-shaped input device will be explained here as an example of the input device taking the input of characters, figures, or the like into consideration, the input device is not at all limited to the example.

As shown in FIG. 8, the input device is provided with a reflecting member (a first reflecting section RE1) with the reflectance varying in the longitudinal direction of the input device, and a reflecting member (a second reflection section RE2) with the reflectance varying in the rotational direction around the axis along the longitudinal direction. The amount of movement (the pressing amount) in the longitudinal direction is obtained based on the reflected light in the first reflecting section RE1 disposed along the longitudinal direction, and the amount of rotation in the rotational direction based on the reflected light in the second reflecting section RE2 disposed along the rotational direction.

Figure 9:
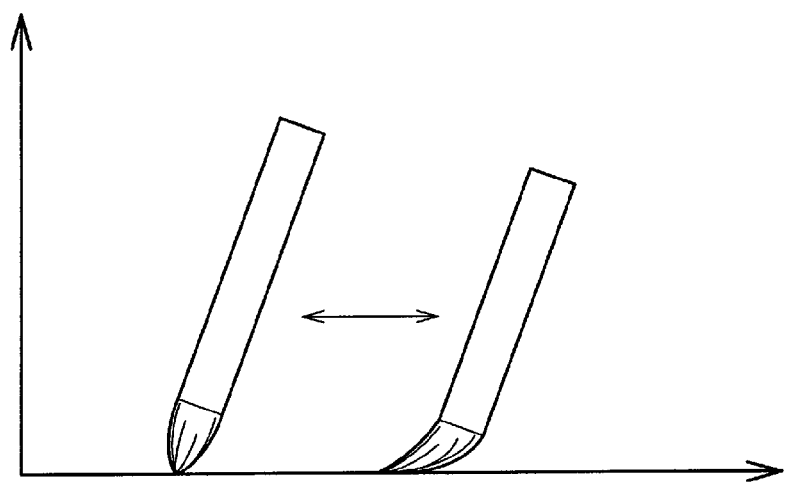
FIG. 9 is a diagram showing an example enabling movement in a longitudinal direction by using a deformable member.
Figure 10:
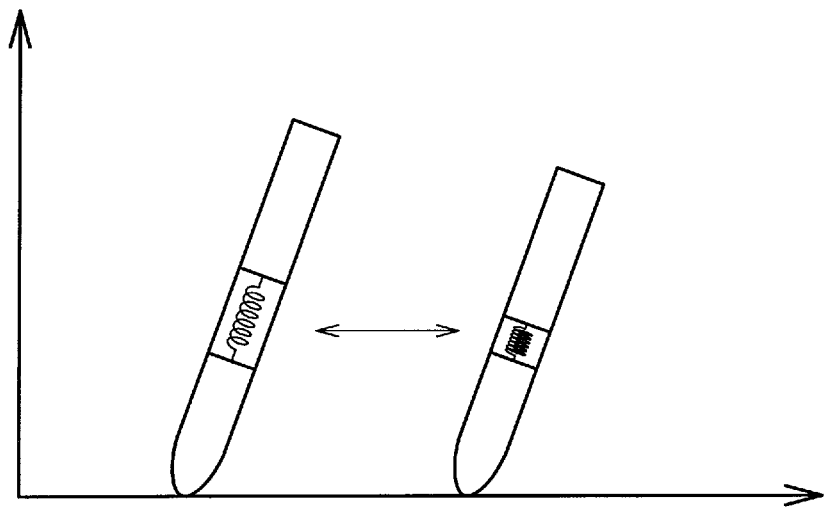
FIG. 10 is a diagram showing an example enabling movement in a longitudinal direction by using a telescopic member.
Figure 11:
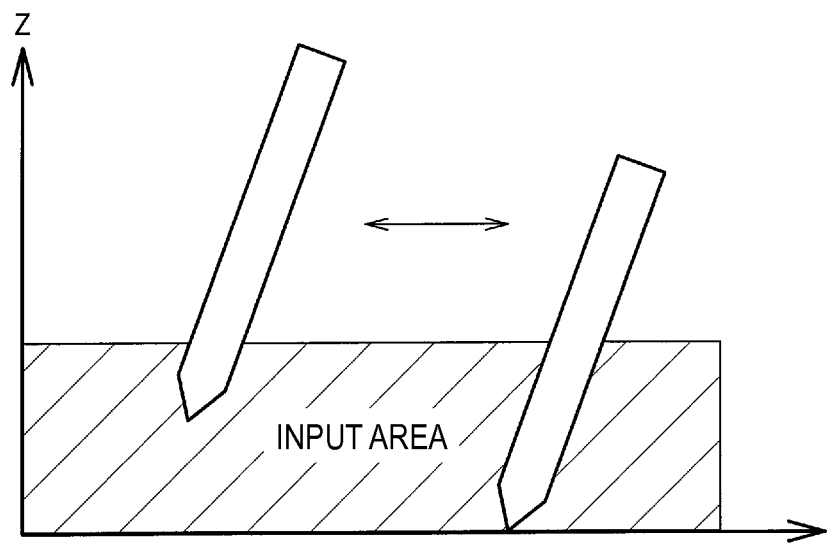
FIG. 11 is a diagram showing an example enabling movement in a longitudinal direction by providing a detection area.

Further, regarding the structure for detecting the amount of movement in the longitudinal direction, a plurality of methods can be adopted. For example, as shown in FIG. 9, the portion corresponding to the pen tip is made of a deformable material similarly to a normal brush. According to this configuration, since it becomes possible to further press the input device toward the target surface direction (i.e., in the longitudinal direction) from the state in which the pen tip has contact with the target surface, the amount of movement in the longitudinal direction can be obtained. Alternatively, it is also possible to adopt a method of dividing the input device into a first part and a second part, and connecting the first and second parts to each other via a flexible material such as a spring as shown in FIG. 10. According also to this configuration, since it becomes possible to further press the input device toward the target surface direction from the state in which the pen tip has contact with the target surface by contracting the spring, the amount of movement in the longitudinal direction can be obtained. Further, it is also possible to adopt an input device without the deformable material or the spring mechanism described above. In such a case, it is arranged that characters can be input even in the condition in which the pen tip is spaced from the target surface. For example, as shown in FIG. 11, a certain Z-coordinate range from the target surface is defined as the input range, and the input operation is performed if the input device exists in the input range. Then, the Z-coordinate information (e.g., the Z-coordinate information of the pen tip portion) of the input device at that occasion is obtained, and thus it is possible to obtain the amount of movement in the longitudinal direction based on the magnitude of the coordinate information.

4.2 Configuration Example of Light Receiving Unit

Figure 12:
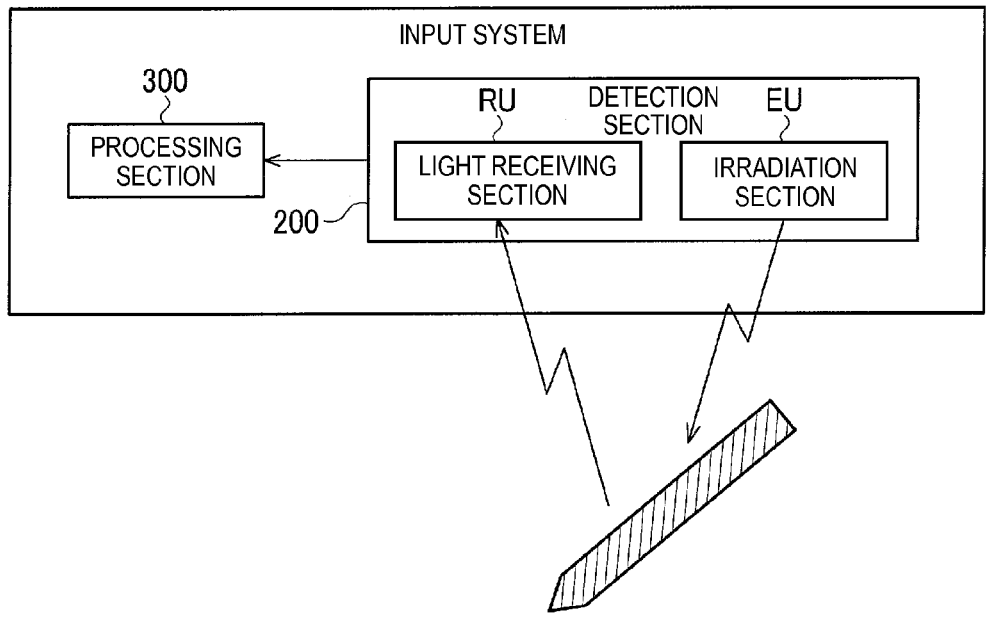
FIG. 12 is a diagram showing a configuration example of an input system according to the present embodiment.
Figure 13:
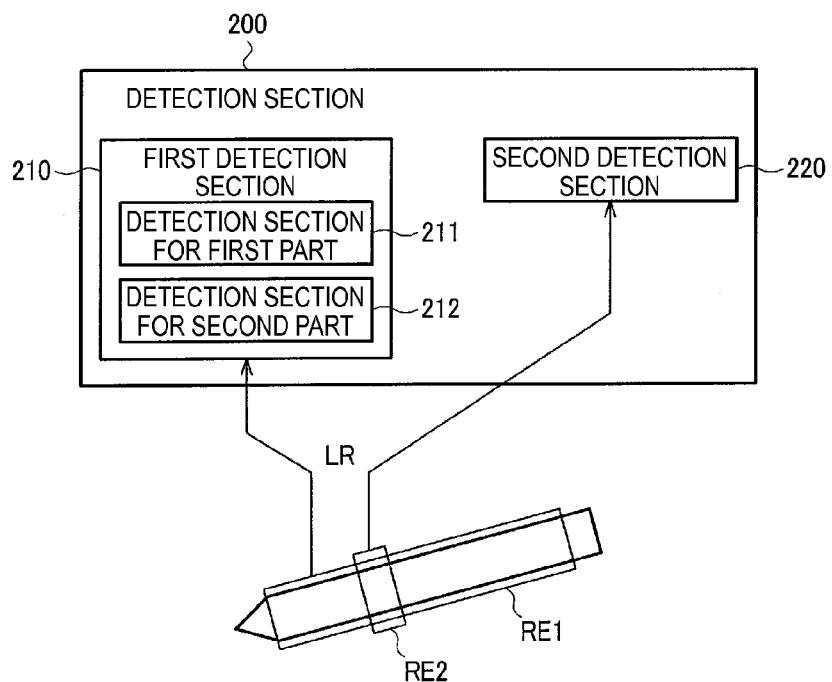
FIG. 13 is a diagram showing a configuration example of a detection section.

Next, the configuration example of the light receiving unit of the optical position detection device 100 will be described. It should be noted that although the explanation is presented here assuming that the light receiving unit is included in the light receiving section RU in the detection section 200 shown in FIG. 12, the light receiving unit corresponds to a first detection section 210, a second detection section 220, and so on included in the detection section 200 shown in FIG. 13 in a broader sense. The first detection section 210 detects the reflected light from the first reflecting section RE1, and the second detection section 220 detects the reflected light from the second reflecting section RE2. Further, as shown in FIG. 13, the first detection section 210 can include a detection section 211 for the first part and a detection section 212 for the second part.

Although in the explanation of the optical position detection device 100 described above, it is assumed that the single light receiving unit is disposed, in the present embodiment, it is assumed that a plurality of light receiving units is used. It should be noted that as described above, it is assumed that each of the light receiving units used in the present embodiment has the light receiving range (here, the Z-coordinate range) restricted to a narrow range for the sake of improvement in position detection accuracy.

Figure 14A:
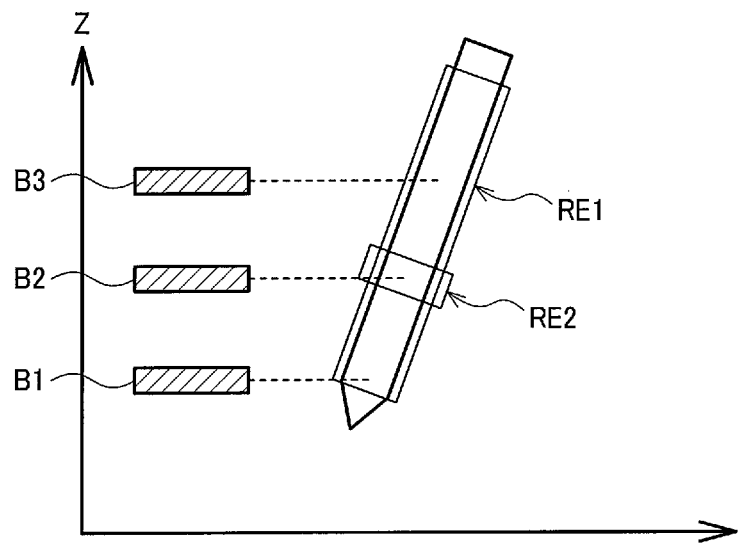
FIGS. 14A and 14B are diagrams for explaining an example of providing three light receiving units.

FIG. 14A shows a configuration example of the light receiving unit. In the present embodiment, a plurality of light receiving units is disposed at positions that are different from each other in the Z-coordinate axis. Here, an example of disposing three light receiving units will particularly be explained. For obtaining the amount of movement in the longitudinal direction among the light receiving units disposed at positions that are different from each other in the Z-coordinate axis, one light receiving unit for receiving the reflected light from the first reflecting section RE1 is provided. Further, for obtaining the rotation amount in the rotational direction, one light receiving unit for receiving the reflected light from the second reflecting section RE2 disposed in the rotational direction is provided. Further, when obtaining the tilt (and the pointing position) of the input device, two light receiving units for receiving the reflected lights from two different points, namely any of the reflected light from the first reflecting section RE1 and the reflected light from the second reflecting section RE2. Therefore, assuming that one of the two light receiving units used when obtaining the tilt is also used as the light receiving unit for obtaining the movement amount information in the longitudinal direction, and the other thereof is also used as the light receiving unit for obtaining the rotation amount information in the rotational direction, it is sufficient to totally prepare two light receiving units when obtaining the movement amount information in the longitudinal direction, the rotation amount information in the rotational direction, and the tilt.

However, as shown in FIG. 8, the second reflecting section RE2 for detecting the rotation amount is disposed in a narrow area in the longitudinal direction in order to be distinguished from the first reflecting section RE1. That is, in view of the fact that the case in which the input device is used while being erected with respect to the target surface 20 can be assumed, since the longitudinal direction is the direction corresponding to the Z-axis direction, the second reflecting section RE2 for detecting the rotation amount is disposed in a narrow range in the Z-coordinate. As explained in the configuration example of the input device, since it is assumed that the input device moves to some extent in the longitudinal direction, there is a possibility that the light receiving unit may fail to receive the reflected light from the second reflecting section RE2 with the movement (including expansion and contraction of the spring mechanism) of the input device in the longitudinal direction.

Figure 14B:
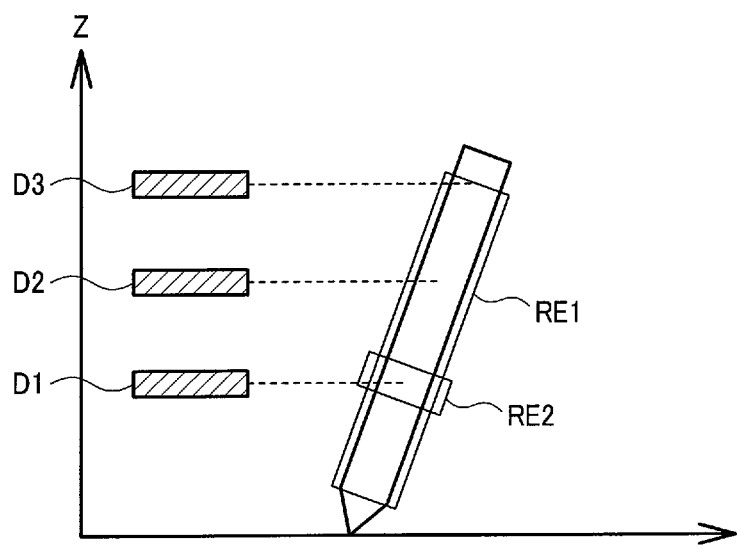

Therefore, in the present embodiment, there are three light receiving units disposed at positions that are different from each other in the Z-coordinate axis. Further, it is assumed that the first light receiving unit receives the reflected light from the first reflecting section RE1. Further, the second light receiving unit and the third light receiving unit are disposed at the respective positions set taking the amount of movement of the input device in the longitudinal direction into consideration, and the reflected light from the second reflecting section RE2 is received with either one of the second light receiving unit and the third light receiving unit. On that occasion, the light receiving unit, which does not receive the reflected light from the second reflecting section RE2, receives the reflected light from the first reflecting section RE1. FIGS. 14A and 14B show an example. The second light receiving unit is disposed at the position (B2) where the reflected light from the second reflecting section RE2 is received in the state with small pressing amount as shown in FIG. 14A, and the third light receiving unit is disposed at the position (D1) where the reflected light from the second reflecting section RE2 is received in the state with large pressing amount as shown in FIG. 14B. Then, in the state shown in FIG. 14A, the reflected light from the first reflecting section RE1 is received by the first light receiving unit (B3) and the third light receiving unit (B1) to thereby obtain the amount of movement in the longitudinal direction, and the reflected light from the second reflecting section RE2 is received by the second light receiving unit (B2) to thereby obtain the rotation amount. Similarly, in the state shown in FIG. 14B, the reflected light from the first reflecting section RE1 is received by the first light receiving unit (D3) and the second light receiving unit (D2) to thereby obtain the amount of movement in the longitudinal direction, and the reflected light from the second reflecting section RE2 is received by the third light receiving unit (D1) to thereby obtain the rotation amount.

It should be noted that the configuration example of the light receiving units is not limited to what is described above. If the second reflecting section RE2 can be set in a broader area in the Z-longitudinal direction, two light receiving units will be sufficient. Further, if either one of the movement amount in the longitudinal direction and the rotation amount is desired, it is sufficient to provide two light receiving units. Here, the reason that the number is set to two is that the acquisition of the tilt information is assumed, and if the tilt of the input device is also unnecessary, it is sufficient to provide just one light receiving unit.

4.3 Acquisition Method of Input Data

Next, an acquisition method of the input data will be explained.

4.3.1 Calibration

Firstly, calibration is performed for setting the reference position of the input position. Here, as a specific example, the position where the input device is completely pressed toward the target surface direction is defined as the reference position.

Specifically, the three pieces of reflectance information are obtained as the calibration information based on the light reception amounts in the respective light receiving units when the input device is completely pressed against the target surface.

4.3.2 Acquisition of X-coordinate Information and Y-coordinate Information

Next, the X-coordinate information and the Y-coordinate information are obtained in each of the light receiving sections. The acquisition method of the coordinate information is as described above in the explanation of the optical position detection device. In the example using the three light receiving units, the coordinate information $(X1, Y1)$ is obtained in the first light receiving unit, the coordinate information $(X2, Y2)$ is obtained in the second light receiving unit, and the coordinate information $(X3, Y3)$ is obtained in the third light receiving unit. Further, since the Z-coordinate position where the first light receiving unit is disposed is Z1, and at the same time, the light receiving unit receives the light in the narrow Z-coordinate range, the three-dimensional information of $(X1, Y1, Z1)$ is obtained as the coordinate information from the first light receiving unit. Similarly, the coordinate information of $(X2, Y2, Z2)$ is obtained from the second light receiving unit, and the coordinate information of $(X3, Y3, Z3)$ is obtained from the third light receiving unit. Thus, since the tilt of the input device can be found (it should be noted that it is assumed that the input device has a linear rod-like shape), the contact position between the input device and the target surface (a drawing surface) can be obtained, and the contact position can be directly used as the drawing position.

4.3.3 Acquisition of Reflectance Information

Figure 15A:
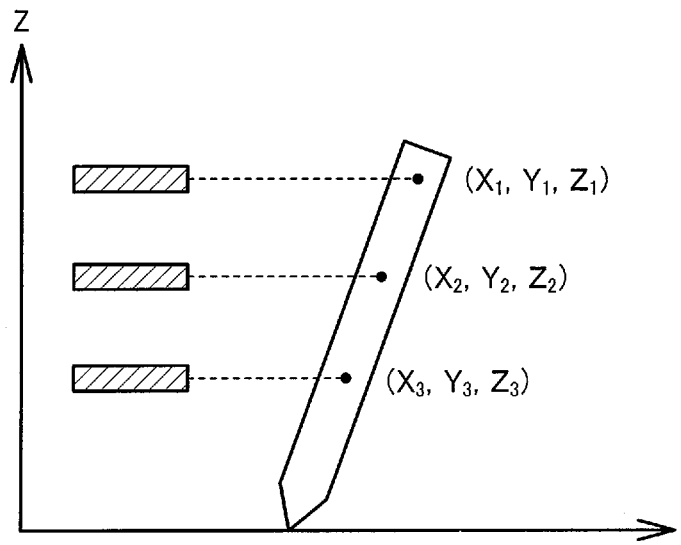
FIGS. 15A and 15B are diagrams showing an example of predicting a position of the input device based on acquired three-dimensional coordinate information.
Figure 15B:
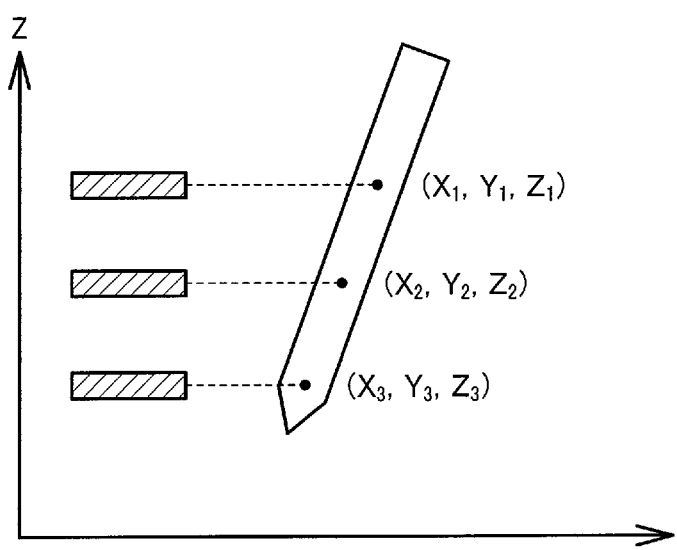

Even if the three pieces of three-dimensional coordinate information are obtained, it is not achievable to obtain the amount of movement in the longitudinal direction and the rotation amount in the rotational direction of the input device. This is because it is only found from the three-dimensional coordinate information that the input device exists at the position where the input device passes through the three points, but whether the input device is in the state shown in FIG. 15A or in the state shown in FIG. 15B is not distinguishable.

Therefore, in the present embodiment, the reflectance information of the input device (in a narrow sense, the first and second reflecting sections provided to the input device) is obtained together therewith. As described above, the first reflecting section RE1 has the reflectance varying so as to draw a gradation in the longitudinal direction of the input device. Therefore, by using the reflectance information (specifically the current value or the like in the light receiving unit), it is possible to determine what part of the input device the information detected by the light receiving unit corresponds to. For example, if it is found that the point s1 (cm) distant from the end of the input device is located at (X1, Y1, Z1), and the point s2 (cm) distant therefrom is located at (X2, Y2, Z2), the three-dimensional position of the input device can be obtained in detail. Similarly, the second reflecting section RE2 has the reflectance varying so as to draw a gradation in the rotational direction around the axis along the longitudinal direction. Therefore, it is possible to obtain what part of the input device faces to the light receiving unit.

It should be noted that the invention is not limited to the method of directly using the absolute value of the value (e.g., the current value in the light receiving unit) represented by the reflectance information. Instead, since the current value varies entirely if there is a cause that, for example, the intensity of the irradiation light in the irradiation section EU varies, there arises a problem if the absolute value of a single value is used. Therefore, it is also possible to acquire the reflectance information at two time points, and then obtain the position information (e.g., the amount of movement in the longitudinal direction and the amount of rotation) by the comparison therebetween. Specifically, it is possible to adopt a method of, for example, using the value at the time of the calibration described above. The variation from the value of the calibration information is detected with reference to the calibration information. In the example described above, since the state of completely pressing the input device is taken as the reference position, it is possible to obtain how much the input device moves or rotates from the state of completely pressing the input device based on the variation from the calibration information.

Further, a variation in the irradiation light intensity might occur in the period from when the calibration is performed to when the actual detection process is performed. On that occasion, it is also possible to detect the reflectance information respectively at a certain time point T1 and at another time point T2, and then obtain the difference between the reflectance information at T1 and the reflectance information at T2. Since the comparison with the reference position is not performed, it may not be possible to obtain the absolute position of the input device, but it becomes possible to obtain the amount of movement (e.g., amount of movement in the longitudinal direction, or the amount of rotation in the rotational direction) in the period from the time point T1 to the time point T2. By setting the interval between the time point T1 and the time point T2 to a sufficiently short interval, an influence of the variation in the irradiation light intensity can be prevented.

It should be noted that although it is assumed in the example described above that a single input device is used, the invention is not limited to this configuration. By providing the reflecting sections, which are different in the reflectance to the extent of being distinguishable from each other, respectively to the plurality of input device, it is also possible to use a plurality of input devices at the same time.

4.3.4 Acquisition of Other Information

With the process described above, it becomes possible to obtain the amount of movement in the longitudinal direction and the amount of rotation in the rotational direction. However, the information, which can be obtained in the present embodiment, is not limited thereto. For example, it is also possible to obtain the amount of movement (here, not only the amount of movement in the longitudinal direction but also the amount of movement in a direction parallel to the target surface, namely in a horizontal direction) of the input device between a certain time period T3 and another time period T4, and use the amount as the input value. Thus, the speed at which the input device is moved can be detected. In a normal pen (or a brush), a difference is caused in the line drawn by the pen between the case of moving the pen fast and the case of moving the pen slowly. Therefore, by obtaining the movement amount information in the horizontal direction, it becomes possible to express the difference in the line due to the difference in speed at which the input device is moved.

4.4 Specific Example of Application

As a specific example of an application using the input system described above, a calligraphy learning system will be described. In the description of characters using a brush in the calligraphy example, there are a lot of expressions using writing pressure and so on unlike the description using a pencil or a ballpoint pen. As represented by the stopping stroke, the flick stroke, and the pullout stroke, by frequently performing the pressing operation of the brush and a lifting operation, and varying the thickness of the line with the moving speed of the brush, a well-modulated character description can be achieved.

In the input system according to the present embodiment, the writing pressure (the pressing amount) can be obtained based on the amount of movement in the longitudinal direction, and the tilt, the moving speed in a horizontal direction, and so on can also be obtained. Further, the rotation of the brush used in the stopping stroke, the flick stroke, and so on can also be obtained from the amount of rotation in the rotational direction.

Therefore, by determining the parameters such as an amount of ink applied to the brush after obtaining, in advance, the correspondence between the three-dimensional movement of the brush and the line to be drawn in the case of using an actual brush, it becomes possible to draw characters with the same feeling as in calligraphy using a real brush. Here, it is possible to store the correspondence between the three-dimensional movement of the brush and the line to be drawn as, for example, a database. Specifically, taking the writing pressure (the pressing amount), the tilt, the rotation amount, and the speed as the parameters, and the values of the parameters and the line (or the dot) to be drawn are made to correspond to each other. Alternatively, it is also possible to divide a character into lateral strokes and vertical strokes, and then divide the vertical strokes into the stopping stroke, a lifting stroke for thinning the line, the flick stroke to the left, the flick stroke to the right, the left pullout stroke, the right pullout stroke, and so on, and then make the correspondence with the line to be drawn.

Further, although the calligraphy learning system is exemplified here, the invention can also be applied to a painting learning system. Further, it is also possible to realize a makeup learning system in a cosmetology school by making the input device correspond to a makeup tool.

In the present embodiment described above, the input system includes the input device, the detection section 200 for performing detection of the reflected light, and the processing section 300 for performing the process based on the detection result in the detection section 200. As shown in FIG. 8, the input device used in the input system has at least one of the first reflecting section RE1 with the reflectance varying in the longitudinal direction of the input device, and the second reflection section RE2 with the reflectance varying in the rotational direction around the axis along the longitudinal direction. Further, the detection section 200 detects the reflected light from at least one of the first reflecting section RE1 and the second reflecting section RE2. Then, the processing section 300 obtains at least one of the movement amount information of the first reflecting section RE1 in the longitudinal direction and the rotation amount information of the second reflecting section RE2 in the rotational direction based on the detection result in the detection section 200. It should be noted that although it is assumed that the input system according to the present embodiment includes the input device, the input system is not limited thereto. It is also possible to adopt an input system using the information from the input device, and including the detection section 200 for detecting the reflected light from at least one of the first reflecting section RE1 and the second reflecting section RE2, and the processing section 300 for obtaining at least one of the movement amount information of the first reflecting section RE1 in the longitudinal direction and the rotation amount information of the second reflecting section RE2 in the rotational direction.

Figure 16:
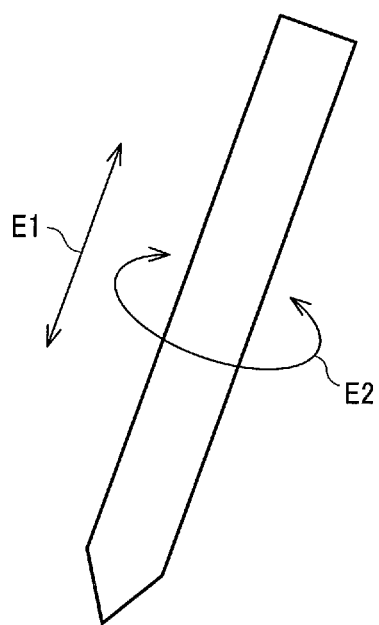
FIG. 16 is a diagram showing an example of a longitudinal direction and a rotational direction.

Here, the longitudinal direction denotes the direction in which the input device has its largest or an elongated dimension. For example, the longitudinal direction of a pencil corresponds to the direction in which the core of the pencil penetrates the wood frame. Further, if the input device is a pen-shaped input device, substantially the same direction as in the case of the pencil corresponds to the longitudinal direction. FIG. 16 exemplifies the longitudinal direction E1 and the rotational direction E2 of the pen-shaped input device. It should be noted that the shape of the input device is not limited to the pen shape, and it is assumed that the longitudinal direction of the case with the input device having another shape than the pen shape denotes the direction in which the dimension has a large value as described above.

Thus, it becomes possible to obtain at least one of the movement amount information of the first reflecting section RE1 in the longitudinal direction and the rotation amount information of the second reflecting section RE2 in the rotational direction, and then use it as the input of the system. The reason that the movement amount information and the rotation amount information can be obtained is that the first reflecting section RE1 has the reflectance varying in the longitudinal direction, and that the second reflecting section RE2 has the reflectance varying in the rotational direction. That is, by additionally obtaining the reflectance information, it is possible to obtain the information, which is difficult to obtain from simple position information (coordinate information). For example, in the case in which the input system is used for the calligraphy learning system, the movement amount information in the longitudinal information corresponds to the pressing (the writing pressure) of the brush, and the rotation amount information in the rotational direction corresponds to the amount of rotation of the brush. Since the pressing and the rotation become important factors for determining the line to be drawn in the expressions of the stopping stroke, the flick stroke, and so on, by obtaining such information, it is possible to realize the system with which one can learn with a feeling close to the feeling in the calligraphy learning using a real brush. It should be noted that as described above the movement of the first reflecting section RE1 in the longitudinal direction occurs with the deformation of the tip portion in some cases as shown in FIG. 9, or occurs with the expansion and contraction of a part of the input device in some cases as shown in FIG. 10. Alternatively, the case of moving the input device while keeping the shape as shown in FIG. 11 is also possible.

Further, it is also possible for the first reflecting section RE1 to have the reflectance gradually varying in the longitudinal direction of the input device. Further, it is also possible for the second reflecting section RE2 to have the reflectance gradually varying in the rotational direction.

The configuration of gradually varying the reflectance denotes the configuration in which, for example, the reflectance is high at one end of the reflecting section, and the reflectance is lowered toward the other end thereof as shown in FIG. 8. The variation can be, for example, a linear variation or a curved variation.

Figure 17B:
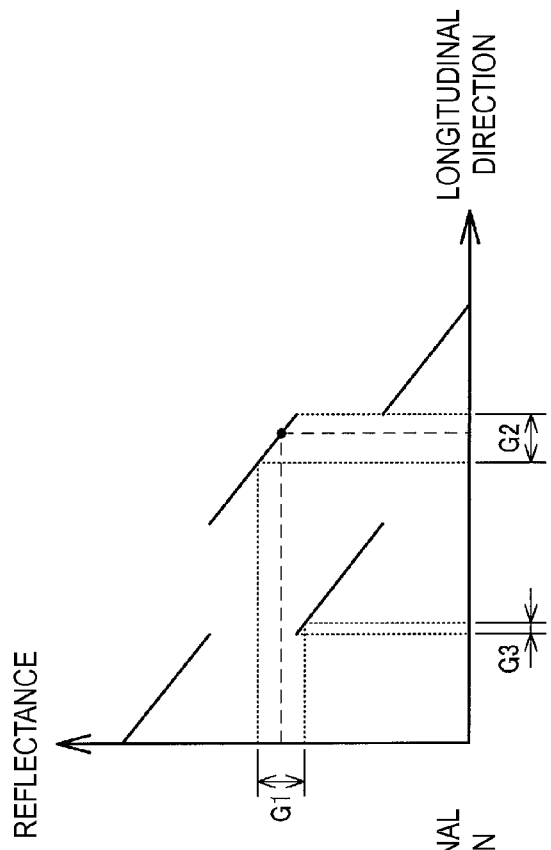
FIGS. 17A and 17B are diagrams for explaining a variation in reflectance in the longitudinal direction and a response to an error.
Figure 17A:
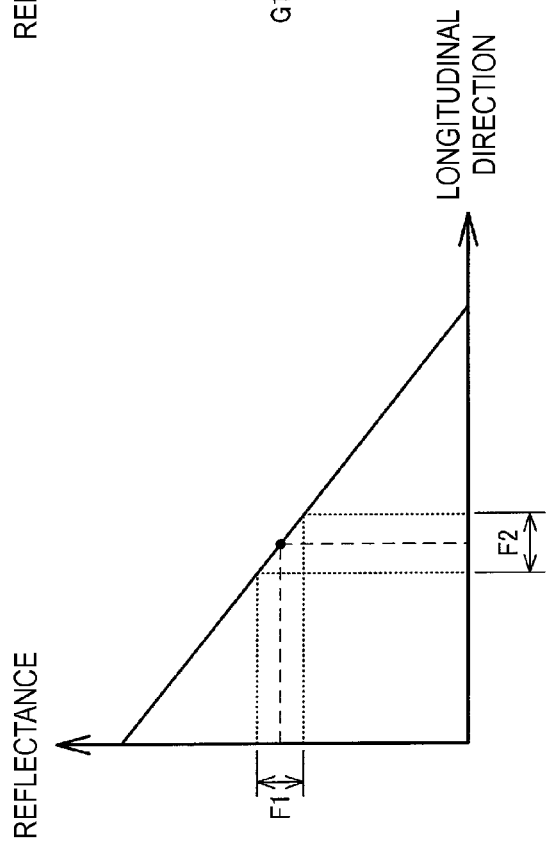

Thus, it becomes possible to, for example, prevent the influence of the detection error compared to the case (e.g., the reflectance varies from a high value to a low value and then rises to a high value in the direction from the one end to the other end) of having a configuration different from the configuration described above. The explanation will be presented with an extreme example. It is assumed that the variation in the reflectance in the longitudinal direction is as shown in FIGS. 17A and 17B. In the case in which the reflectance varies gradually (linearly in this case) as in the present embodiment, even if the error as much as F1 occurs in the detection value of the reflectance, the detected position in the longitudinal direction corresponding thereto is centered on the true value as the range F2, and the influence exerted on the system is small. In contrast thereto, in the reflectance shown in FIG. 17B, if the error as much as G2 occurs in the detection value of the reflectance, the detected position in the longitudinal direction corresponding thereto is distributed as the ranges G2, G3. In the case of the range G2, the influence is small, but in the case of the range G3, a value extremely different from the true value is detected. In view of the above, the configuration in which the reflectivity varies gradually in the longitudinal direction or the rotational direction is advantageous.

Further, it is also possible for the processing section 300 to obtain the positional information of the pointing position of the input device based on the detection result of the reflectance in the first reflecting section RE1.

Here, the pointing position of the input device denotes a position on the target surface 20 pointed out with, for example, the input device. Assuming that the input device is a pen-shaped input device, the point on the target surface, which is pointed out by the pen tip or the point as an extension of the pen tip in the longitudinal direction, corresponds to the pointing position.

Thus, it becomes possible to additionally use the information of the pointing position as the input of the system. Since the pointing position is found, drawing of characters on the target surface, linkage (e.g., selection of data) with other data displayed on the target surface, and so on become possible. Specifically, for example, the three-dimensional coordinate information of each of two points on the first reflecting section RE1 is detected, and then the pointing position is obtained from the three-dimensional coordinate information thus detected. For example, it is assumed that the coordinate of a point A on the first reflecting section RE1 is (XA, YA, ZA), and the coordinate of a point B, which is different from the point A, and located on the first reflecting section RE1, is (XB, YB, ZB). As such, it is possible to adopt a method of determining the intersection between the vector (XB-XA, YB-YA, ZB-ZA) and the target surface (the plane Z=0) as the pointing position. Further, according to the method described above, only the three-dimensional coordinate information of each of the two points on the input device is obtained, and it is not required that both points are points on the first reflecting section RE1. For example, it is also possible to perform a similar process using the two points, namely the point on the first reflecting section RE1 and the point on the second reflecting section RE2.

Further, as shown in FIG. 13, the detection section 200 can include the first detection section 210 and the second detection section 220. The first detection section 210 detects the reflected light from the first reflecting section RE1, and the second detection section 220 detects the reflected light from the second reflecting section RE2.

Thus, since it becomes possible to perform detection of the reflected light from the first reflecting section RE1 and detection of the reflected light from the second reflecting section RE2 in parallel to each other, speeding up of the process can be achieved. Further, as described later, in the case in which the second detection section 220 is realized as the light receiving unit, the case in which the light receiving area of the light receiving unit is limited to a narrow area can be assumed. On that occasion, since the reflected light is detected at different positions with different detection sections, the detection section is divided into a plurality sections as described above. Further, the fact that the detection section 200 includes the first detection section 210 and the second detection section 220 also means that in the case of dividing the detection section 200 into several units, the number of units is basically two. In the case of obtaining both the movement amount information and the rotation amount information, if the detection section 200 is realized by the light receiving units, a total of two light receiving units are provided, one for the movement amount information in the longitudinal direction, the other for the rotation amount information in the rotational direction, as described above. Further, if it is assumed that the light receiving unit for the movement amount information and the light receiving unit for the rotation amount information are also used as the two light receiving units for obtaining the tilt (the pointing position), the total number of light receiving units is two.

Further, the first detection section 210 can include the detection section 211 for the first part and the detection section 212 for the second part. The detection section 211 for the first part detects the reflected light from the first part of the first reflecting section RE1, and the detection section 212 for the second part detects the reflected light from the second part different in the longitudinal direction from the first part. Further, the processing section 300 can obtain the tilt information of the input device based on the detection result in the detection section 211 for the first part and the detection section 212 for the second part.

Thus, it becomes possible to detect the reflected light in the first part and the second part, which are the two points on the first reflecting section RE1 that are different from each other in the longitudinal direction, in the detection section 211 for the first part and the detection section 212 for the second part, respectively. Therefore, since the position information (e.g., the three-dimensional coordinate information) of the two points of the input device is found, the tilt information of the input device can be obtained. The position information of the pointing position described above, for example, can be obtained from the tilt information. Further, the fact that the first detection section 210 includes the detection section 211 for the first part and the detection section 212 for the second part means that in the case of dividing the detection section 200 into a plurality of units, the detection section 200 can also be realized with three units. Here, the three units denote the detection section 211 for the first part, the detection section 212 for the second part, and the second detection section 220. As explained using FIGS. 14A and 14B, in the example of the light receiving unit, it is desirable to prepare two light receiving units for receiving the reflected light from the second reflecting section RE2, one for the case in which the movement amount in the longitudinal direction is small, and the other for the case in which the movement amount is large. Further, the reflected light from the second reflecting section RE2 is detected by the more appropriate one of the two units, and the reflected light from the first reflecting section RE1 is detected by the other thereof (the latter is not necessarily essential). In other words, in the case of FIG. 14A, the light receiving units B3, B1 correspond respectively to the detection sections 211, 212, and the light receiving unit B2 corresponds to the second detection section 220. Further, in the case of FIG. 14B, the light receiving units D3, D2 correspond respectively to the detection sections 211, 212, and the light receiving unit D1 corresponds to the second detection section 220.

Further, the input device can be a pen-shaped input device. Further, it is also possible for the processing section 300 to obtain the writing pressure information of the input device as the pen-shaped input device based on the movement amount information of the first reflecting section RE1 in the longitudinal direction.

Thus, it becomes possible to obtain the writing pressure of the pen from the movement amount information in the longitudinal direction. Since the width and the depth of the line to be drawn vary in accordance with the writing pressure, by obtaining the writing pressure information, the number of types of lines to be drawn is increased, and enhanced expression can be achieved.

Further, the detection section 200 can include the irradiation section EU for emitting outgoing light, and the light receiving section RU for receiving the reflected light caused by the input device reflecting the outgoing light. Then, the processing section 300 obtains at least one of the movement amount information of the first reflecting section RE1 in the longitudinal direction and the rotation amount information of the second reflecting section RE2 in the rotational direction based on the light receiving result in the light receiving section RU.

Thus, it becomes possible to use the optical position detection device 100 in the input system according to the present embodiment. The specific example of the optical position detection device 100 is as described above.

Further, the light receiving section RU can be disposed at the central portion of the irradiation section EU. Further, the light receiving section RU receives the reflected light reflected toward the irradiation section EU out of the reflected light caused by the input device reflecting the outgoing light emitted by the irradiation section EU. In particular, as shown in FIG. 19, the irradiation section EU can include the first irradiation unit EU1 and the second irradiation unit EU2. The first irradiation unit EU1 is disposed at a first X-coordinate position, and the second irradiation unit EU2 is disposed at a second X-coordinate position. As such, the light receiving section RU includes the light receiving unit RU1 for the first irradiation unit and the light receiving unit RU2 for the second irradiation unit. Further, the light receiving unit RU1 is disposed at the center of the first irradiation unit EU1, and the light receiving unit RU2 is disposed at the center of the second irradiation unit EU2.

Here, the direction of the X axis to be the reference of the X-coordinate position is as described above, and is, for example, the direction shown in FIG. 1. The plane along the target surface 20 is the X-Y plane, and it is assumed here that the side in the horizontal direction out of the sides of the target surface 20 coincides with the direction of the X axis.

Thus, it becomes possible to dispose the light receiving section RU at the center of the irradiation section EU. As described later, this configuration is particularly effective in the case of forming the first reflecting section RE1 and the second reflecting section RE2 with the retroreflective member. The retroreflective member has a property of returning intensive reflected light toward the direction in which the light enters. Therefore, by disposing the irradiation section EU for emitting the incident light and the light receiving section RU for receiving the reflected light in the same direction viewed from the input device (the first reflecting section RE1 and the second reflecting section RE2 provided to the input device), it becomes possible for the light receiving section RU to receive the intensive reflected light. As the intensity of the received reflected light increases, the signal value (e.g., the current value) to be detected becomes higher. As such, the position detection accuracy of the input device can be improved. In particular, by adopting the configuration of providing two irradiation units and two light receiving units as shown in FIG. 19, it becomes possible to detect the position information of the input device without using the method (the method of obtaining the distance between the optical position detection device and the input device) shown in FIGS. 6A and 6B.

Further, in the case of defining the coordinate axis perpendicular to the target surface along the detection area of the input device as the Z-coordinate axis, the light receiving section RU has a first light receiving unit PD1 disposed at a first Z-coordinate position, and a second light receiving unit PD2 disposed at a second Z-coordinate position. Further, the first light receiving unit PD1 receives the reflected light from the first reflecting section RE1, and the second light receiving unit PD2 receives the reflected light from the second reflecting section RE2.

Thus, when receiving the reflected light from the first reflecting section RE1 and the reflected light from the second reflecting section RE2, it becomes possible to provide the respective light receiving units separate from each other. As described above, due to the problem of the detection accuracy and so on, each of the light receiving units has the Z-coordinate range where the light can be received restricted to a narrow range with a slit or the like. Therefore, in view of the fact that it is assumed that the first reflecting section RE1 and the second reflecting section RE2 are disposed at respective positions that are different from each other in the Z-coordinate position, it is desirable to provide a plurality of light receiving units, and the configuration of providing at least two light receiving units is adopted in the present embodiment. It should be noted that the case of obtaining both the movement amount information in the longitudinal direction and the rotation amount information in the rotational direction is assumed here.

Further, the light receiving section RU can include a third light receiving unit PD3 disposed at a third Z-coordinate position that is different from the first Z-coordinate position and the second Z-coordinate position. Further, the first light receiving unit PD1 receives the reflected light from the first part of the first reflecting section RE1, and the third light receiving unit PD3 receives the reflected light from the second part of the first reflecting section RE1.

Thus, it becomes possible to detect the reflected light in the first part and the second part, which are the two points on the first reflecting section RE1 that are different from each other in the longitudinal direction, in the first light receiving unit PD1 and the third light receiving unit PD3. Therefore, since the position information (e.g., the three-dimensional coordinate information) of the two points of the input device is found, the tilt information of the input device can be obtained.

The position information of the pointing position described above, for example, can be obtained from the tilt information. Here, the light receiving units PD1 through PD3 correspond to any of the light receiving units B1 through B3 (or the light receiving units D1 through D3 shown in FIG. 14B) shown in FIG. 14A. As described above, two units for receiving the reflected light from the second reflecting section RE2 are disposed in accordance with the amount of movement in the longitudinal direction, and the appropriate one thereof is used. Although the configuration is redundant in view of the number of light receiving units, it becomes possible to appropriately receive the reflected light from the second reflecting section RE2. It should be noted that regarding the correspondence with the drawings, for example, the first light receiving unit PD1 corresponds to the light receiving unit B3, the second light receiving unit PD2 corresponds to the light receiving unit B2, and the third light receiving unit PD3 corresponds to the light receiving unit B1 in FIG. 14A. Further, in the case of FIG. 14B, the first light receiving unit PD1 corresponds to the light receiving unit D3, the second light receiving unit PD2 corresponds to the light receiving unit D1, and the third light receiving unit PD3 corresponds to the light receiving unit D2.

Further, the first reflecting section RE1 and the second reflecting section RE2 can also be formed of the retroreflective member, which returns intensive reflected light toward the direction of the light source when the light enters from the light source.

Thus, it becomes possible to return the intensive reflected light toward the direction from which the incident light enters. In the present embodiment, there is a case in which the part (e.g., the irradiation section EU for emitting the outgoing light) for emitting the incident light and the detection section (e.g., the light receiving section RU for receiving the reflected light) for detecting the reflected light are disposed at positions close to each other. In this case, if the reflected light is scattered when the outgoing light is reflected by the input device, the intensity of the reflected light, which can be detected by the detection section 200, is reduced, which causes the problem that, for example, the influence of noise increases. In this regard, by forming the reflecting sections RE1, RE2 using the retroreflective member, since the intensive reflected light is returned toward the direction in which the part for emitting the incident light, and therefore the detection section 200, is located, it becomes possible to increase the signal level (e.g., the current value in the light receiving section) to be detected.

Further, the present embodiment relates to the pen-shaped input device including the first reflecting section RE1 provided for detecting the movement amount information in the longitudinal direction of the pen-shaped input device or a part of the pen-shaped input device. Further, the first reflecting section RE1 has the reflectance varying in the longitudinal direction.

Thus, it becomes possible to realize the pen-shaped input device having the first reflecting section RE1 having the reflectance varying in the longitudinal direction, and for detecting the movement amount information in the longitudinal direction of the pen-shaped input device (or a part of the pen-shaped input device) using the first reflecting section RE1. As described hereinabove, the input device according to the present embodiment is capable of obtaining the information corresponding to the writing pressure of the pen using the movement amount information in the longitudinal direction, and can be applied to the application in which the writing pressure information becomes essential such as the calligraphy learning system.

Further, the pen-shaped input device can include the second reflecting section RE2 provided for detecting the rotation amount information of the pen-shaped input device. Further, the second reflecting section RE2 has the reflectance varying in the rotational direction around the axis along the longitudinal direction.

Thus, it becomes possible to realize the pen-shaped input device capable of obtaining the rotation amount in the rotational direction around the axis along the longitudinal direction. When drawing a line, since the rotation of the pen becomes an important factor as well as the writing pressure and the tilt of the pen, by using the pen-shaped input device according to the present embodiment capable of detecting the rotation amount information, enhanced line expression can be achieved.

Further, it is possible that the pen-shaped input device includes a first part, and a second part disposed on the pen tip side, the first reflecting section RE1 is provided to the first part, and the second reflecting section RE2 is provided to the second part.

Figure 18:
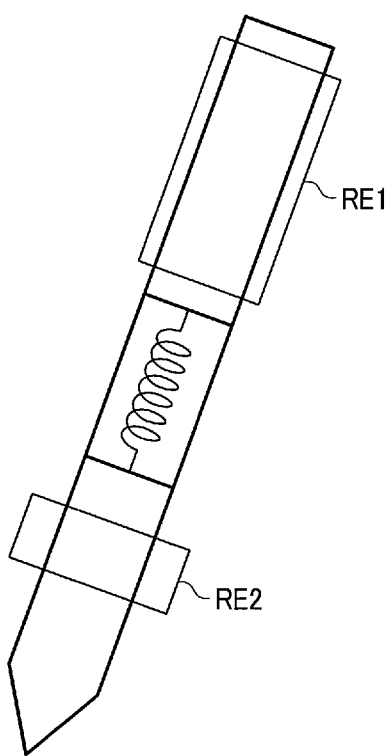
FIG. 18 is a diagram showing an example of providing a first part with a first reflecting section, and providing a second part with a second reflecting section.

Thus, it becomes possible to realize the pen-shaped input device shown in, for example, FIG. 18. It is assumed in the example shown in FIG. 18 that the first part and the second part are connected to each other with the flexible or spring mechanism. By adopting such a configuration, even in the case of pressing the pen-shaped input device toward the target surface, the position of the second part, namely the position of the second reflecting section RE2 does not change. As described above, in some cases, the second reflecting section RE2 is limited to a narrow range in the Z-axis direction. Therefore, assuming the movement of the second reflecting section RE2 in the longitudinal direction (mainly corresponding to the Z-axis direction), there arises the necessity of, for example, providing a plurality of detection sections. However, if the second reflecting section RE2 is provided to the part on the pen tip side as shown in FIG. 18, the position of the second reflecting section RE2 does not change, and therefore, it becomes sufficient to provide a single detection section for detecting the second reflecting section RE2, and it becomes possible to simplify the configuration of the system.

Further, the present embodiment relates to the pen-shaped input device including the reflecting section provided for detecting the rotation amount information in the rotational direction around the axis along the longitudinal direction of the pen-shaped input device. Further, the reflecting section has the reflectance varying in the rotational direction.

Thus, it becomes possible to realize the pen-shaped input device capable of obtaining the rotation amount information in the rotational direction. Here, the pen-shaped input device for obtaining only the rotation amount information without obtaining the movement amount information in the longitudinal direction is particularly assumed.

It should be noted that although the present embodiment is hereinabove explained in detail, it should easily be understood by those skilled in the art that various modifications not substantially departing from the spirit and effect of the invention are possible. Therefore, such modified examples should be included in the scope of the invention. For example, a term described at least once with a different term having a broader sense or the same meaning in the specification or the accompanying drawings can be replaced with a different term in any part of the specification or the accompanying drawings. Further, the configurations and operations of the input system, the pen-shaped input device, and so on are also not limited to those explained above, but can be put into practice in various modified forms.

The entire disclosure of Japanese Patent Application No. 2011-082502 filed Apr. 4, 2011 is expressly incorporated by reference herein.

What is claimed is:

1. An input system comprising:
an input device including at least one of:
a first reflecting section having a reflectance varying in a longitudinal direction, and
a second reflecting section having a reflectance varying in a rotational direction around an axis extending in the longitudinal direction;
a detection section adapted to detect reflected light from the at least one of the first reflecting section and the second reflecting section; and
a processing section adapted to obtain at least one of:
movement amount information of the first reflecting section in the longitudinal direction, and
rotation amount information in the rotational direction of the second reflecting section,
based on the detection result in the detection section.

2. The input system according to claim 1 wherein
the reflectance of the first reflecting section gradually varies in the longitudinal direction of the input device, and
the reflectance of the second reflecting section gradually varies in the rotational direction around the axis.

3. The input system according to claim 1 wherein
the processing section obtains position information of a pointing position of the input device based on the detection result of the reflectance of the first reflecting section.

4. The input system according to claim 1 wherein
the detection section includes:
a first detection section adapted to detect the reflected light from the first reflecting section, and
a second detection section adapted to detect the reflected light from the second reflecting section.

5. The input system according to claim 4 wherein
the first detection section includes:
a first part detection section adapted to detect reflected light from a first part of the first reflecting section, and
a second part detection section adapted to detect reflected light from a second part, the second part being longitudinally spaced apart from the first part, and
the processing section obtains tilt information of the input device based on the detection result in the first part detection section and the second part detection section.

6. The input system according to claim 1 wherein
the input device is a pen-shaped input device, and
the processing section obtains writing pressure information of the pen-shaped input device based on the movement amount information of the first reflecting section in the longitudinal direction.

7. The input system according to claim 1 wherein
the detection section includes:
an irradiation section adapted to emit outgoing light, and
a light receiving section adapted to receive reflected light caused by the input device reflecting the outgoing light, and
the processing section obtains the at least one of the movement amount information of the first reflecting section in the longitudinal direction, and the rotation amount information of the second reflecting section, based on a light reception result in the light receiving section.

8. The input system according to claim 7 wherein
the light receiving section is disposed at a center of the irradiation section, and the light receiving section receives the reflected light that is reflected toward the irradiation section out of the reflected light caused by the input device reflecting the outgoing light.

9. The input system according to claim 8 wherein
the irradiation section includes:
   a first irradiation unit disposed at a first X-coordinate position, and
   a second irradiation unit disposed at a second X-coordinate position that is different from the first X-coordinate position,
the light receiving section includes:
   a first light receiving unit for the first irradiation unit, and
   a second light receiving unit for the second irradiation unit,
the first light receiving unit is disposed at the first X-coordinate position corresponding to a center of the first irradiation unit, and
the second light receiving unit is disposed at the second X-coordinate position corresponding to a center of the second irradiation unit.

10. The input system according to claim 7 wherein
a coordinate axis perpendicular to a target surface along a detection area of the input device is defined as a Z-coordinate axis,
the light receiving section includes:
   a first light receiving unit disposed at a first Z-coordinate position, and
   a second light receiving unit disposed at a second Z-coordinate position that is different from the first Z-coordinate position,
the first light receiving unit receives the reflected light from the first reflecting section, and
the second light receiving unit receives the reflected light from the second reflecting section.

11. The input system according to claim 10 wherein
the light receiving section includes a third light receiving unit disposed at a third Z-coordinate position that is different from the first Z-coordinate position and the second Z-coordinate position,
the first light receiving unit receives the reflected light from a first part of the first reflecting section, and
the third light receiving unit receives the reflected light from a second part of the first reflecting section.

12. The input system according to claim 1 wherein
the first reflecting section and the second reflecting section comprise retroreflective members.

* * * * *